United States Patent
Miyamoto et al.

(10) Patent No.: US 12,487,270 B2
(45) Date of Patent: Dec. 2, 2025

(54) DISCHARGE DETECTION DEVICE

(71) Applicant: NITTO KOGYO CORPORATION, Nagakute (JP)

(72) Inventors: Atsushi Miyamoto, Nagakute (JP); Tomonori Kakehi, Nagakute (JP); Yusuke Aita, Nagakute (JP); Koichiro Kato, Nagakute (JP); Tomoyasu Sakai, Nagakute (JP); Hiyori Ajioka, Nagakute (JP); Hiroyasu Ito, Nagakute (JP)

(73) Assignee: NITTO KOGYO CORPORATION, Nagakute (JP)

( * ) Notice: Subject to any disclaimer, the term of this patent is extended or adjusted under 35 U.S.C. 154(b) by 261 days.

(21) Appl. No.: 18/039,994

(22) PCT Filed: Dec. 1, 2021

(86) PCT No.: PCT/JP2021/044161
§ 371 (c)(1),
(2) Date: Jun. 2, 2023

(87) PCT Pub. No.: WO2022/118901
PCT Pub. Date: Jun. 9, 2022

(65) Prior Publication Data
US 2024/0036098 A1 Feb. 1, 2024

(30) Foreign Application Priority Data

Dec. 4, 2020 (JP) .................................. 2020-201864
Apr. 6, 2021 (JP) .................................. 2021-064555
(Continued)

(51) Int. Cl.
*G01R 31/12* (2020.01)
*G01R 23/167* (2006.01)

(52) U.S. Cl.
CPC ....... *G01R 31/1272* (2013.01); *G01R 23/167* (2013.01)

(58) Field of Classification Search
CPC .. G01R 31/1272; G01R 23/167; G01R 31/14; G01R 31/12
See application file for complete search history.

(56) References Cited

U.S. PATENT DOCUMENTS 5,804,991 A * 9/1998 Hu ........................... H01H 9/56
327/263
5,808,443 A * 9/1998 Lundstrom ........... H01M 10/44
320/DIG. 22
(Continued)

FOREIGN PATENT DOCUMENTS

CN 111157853 A 5/2020
EP 1094323 A2 4/2001
(Continued)

*Primary Examiner* — Akm Zakaria
(74) *Attorney, Agent, or Firm* — The Webb Law Firm

(57) ABSTRACT

Provided is a discharge detector for detecting discharge occurred in a circuit with an electrically connected load based on a noise in a high frequency band superimposed on an alternating current power source supplied to the circuit. The discharge detector includes a high pass filter configured to extract a frequency component in a high frequency band from the alternating current power source; an amplifier configured to amplify an output of the high pass filter; a smoothing section configured to smooth an output of the amplifier; a phase division section configured to specify a peak time domain including time before and after a peak value and a zero cross time domain including time before and after a 0 value based on a value in one cycle of a voltage or current of the alternating current power source; and a determination section configured to determine whether discharge has occurred based on a difference between a first output of the smoothing section in the peak time domain and
(Continued)

a second output of the smoothing section in the zero cross time domain.

12 Claims, 28 Drawing Sheets

(30) Foreign Application Priority Data

Jun. 30, 2021 (JP) .................................. 2021-108353
Sep. 22, 2021 (JP) .................................. 2021-153843

(56) References Cited

U.S. PATENT DOCUMENTS

| | | | |
|---|---|---|---|
| 6,433,978 B1* | 8/2002 | Neiger | H02H 1/0015 324/520 |
| 2011/0172970 A1 | 7/2011 | Kang et al. | |
| 2014/0142447 A1* | 5/2014 | Takahashi | H03F 3/45475 600/509 |
| 2015/0362549 A1* | 12/2015 | Noguchi | G01R 31/129 324/750.01 |
| 2022/0128614 A1 | 4/2022 | Yamada et al. | |

FOREIGN PATENT DOCUMENTS

| | | |
|---|---|---|
| JP | H3261313 A | 11/1991 |
| JP | H580112 A | 4/1993 |
| JP | H8146077 A | 6/1996 |
| JP | H1078471 A | 3/1998 |
| JP | 2005140721 A | 6/2005 |
| JP | 2008298514 A | 12/2008 |
| JP | 2019184480 A | 10/2019 |
| JP | 2020134231 A | 8/2020 |
| WO | 2019182246 A1 | 9/2019 |
| WO | 2021038960 A1 | 3/2021 |

* cited by examiner $$C = C_{01} + C_{03} + \cdots C_{0X} = 7\,6$$

$$C' = C_{02} + C_{04} + \cdots C_{0X+1} = 3\,8$$

$$C - C' = 3\,8$$

$$C = C_{01} + C_{03} + \cdots C_{0X} = 76$$

$$C' = C_{02} + C_{04} + \cdots C_{0X+1} = 76$$

$$C - C' = 0$$

DISCHARGE DETECTION DEVICE

CROSS-REFERENCE TO RELATED APPLICATIONS

This application is the United States national phase of International Patent Application No. PCT/JP2021/044161 filed Dec. 1, 2021, and claims priority to Japanese Patent Application Nos. 2020-201864 filed Dec. 4, 2020, 2021-064555 filed Apr. 6, 2021, 2021-108353 filed Jun. 30, 2021, and 2021-153843 filed Sep. 22, 2021, the disclosures of which are hereby incorporated by reference in their entireties.

BACKGROUND OF THE INVENTION

Field of the Invention

The present invention relates to a discharge detector for detecting discharge occurred by an accident, such as tracking, a short circuit, and disconnection.

Description of Related Art

Japanese Patent Application Kokai Publication Nos. 2019-184480 and 2020-134231 describe a discharge detector in the past. For example, when discharge occurs in an electrical circuit of a house, a noise in a high frequency band is superimposed on the utility power. The noise superimposed on the utility power appears before and after the peak in the waveform of the utility power. The discharge detector detects the noise in the high frequency band superimposed on the utility power by a current sensor or a voltage sensor to determine whether discharge has occurred.

FIG. 25 illustrates a configuration of a discharge detector 100 in the past. The discharge detector 100 is configured with a high pass filter 111, an amplifier 112, a smoothing section 113, and a determination section 115. The high pass filter 111 is electrically connected to the utility power and a load. The load refers to various devices that operate by consuming power.

FIG. 26 illustrates a voltage waveform of the utility power and a voltage waveform of each component of the discharge detector 100. The signs (1), (2), (3), and (4) illustrated in FIGS. 25 and 26 indicate that the components in FIG. 25 correspond to the output waveforms in FIG. 26. With reference to (1) through (4) in FIGS. 25 and 26, a description is given below to the process of each component of the discharge detector 100 in the past.

(1) A sine wave illustrated at the beginning of FIG. 26 is a voltage waveform of the utility power on which a noise in a high frequency band is superimposed. As illustrated in this sine wave, the noise in a high frequency band appears before and after the peaks in the voltage waveform of the utility power. The high pass filter 111 passes, without attenuation, frequency components higher than a cutoff frequency among the frequency components of the utility power. The noise in a high frequency band superimposed on the utility power is thus extracted.

(2) The noise extracted by the high pass filter 111 is amplified by the amplifier 112. The amplifier 112 amplifies the extracted noise, for example, 20 times. The noise amplified by the amplifier 112 generates a waveform to alternately repeat "0" and "1" at short intervals. It is difficult to determine whether discharge has occurred based on such a short intermittent waveform.

(3) The smoothing section 113 smooths the waveform of the noise amplified by the amplifier 112. The smoothing is, for example, process of connecting peaks in the waveform of the amplified noise. The smoothed noise waveform forms a line connecting the peaks of "1" in the amplified noise waveform.

(4) Examples of the determination section 115 to be used include arithmetic devices, such as a microcontroller unit (MCU) and a microcomputer. The determination section 115 determines whether discharge has occurred based on the noise waveform smoothed by the smoothing section 113. For example, the determination section 115 determines whether the noise level is more than the threshold. If the noise level is more than the threshold, the determination section 115 determines whether the noise at the level more than the threshold continues for more than a predetermined time. If the noise at the level more than the threshold continues for more than a predetermined time, the determination section 115 determines that discharge has occurred.

PRIOR ART DOCUMENTS

Patent Document

Patent Document 1: Japanese Patent Application Kokai Publication No. 2019-184480
Patent Document 2: Japanese Patent Application Kokai Publication No. 2020-134231

SUMMARY OF THE INVENTION

Problems to be Solved by the Invention

Case 1 of Erroneous Determination of Discharge

The discharge detector 100 in the past has a problem of not capable of distinguishing a noise generated by discharge from a noise generated by normal operation of a load. For example, some devices provided with a motor, such as an electric drill and an electric mixer, continuously generate a noise at the level more than the threshold during normal operation. A sine wave illustrated at the beginning of FIG. 27 is a voltage waveform of the utility power on which a noise generated by normal operation of a load is superimposed. The signs (1) through (4) in FIG. 27 indicate that the output waveforms in FIG. 27 correspond to the components in FIG. 25.

As illustrated in FIG. 27, a noise generated by normal operation of a load is superimposed on the entire utility power including the peaks. The noise is extracted by the high pass filter 111 and then amplified by the amplifier 112. Then, the waveform of the noise amplified by the amplifier 112 is smoothed by the smoothing section 113. The noise generated by normal operation of the load continues during the operation of the load. For this reason, if the noise level is more than the threshold, the determination section 115 erroneously determines that discharge has occurred.

Case 2 of Erroneous Determination of Discharge

The discharge detector 100 in the past has a problem of erroneously determining that discharge has not occurred if the level of a noise generated by discharge instantaneously decreases. As described above, the determination section 115 determines that discharge has occurred if a noise at a level of the threshold or more continues until a predetermined time passes. However, as illustrated in an output waveform of the noise of FIG. 28, the level of the noise generated by discharge is sometimes instantaneously less than the threshold while the determination section 115 measures the predetermined time. In this case, the determination section 115 erroneously determines that discharge has not occurred.

Objects of the Present Invention

The present invention has been made in view of the above problems, and it is an object thereof to provide a discharge detector capable of improving discharge detection accuracy and specifying the circuit in which the discharge occurred.

It is also an object of the present invention to provide a discharge detector capable of accurately detecting that discharge has occurred even if the level of the noise generated by the discharge instantaneously falls below a threshold.

Means to Solve the Problems

A discharge detector of the present invention for detecting discharge occurred in a circuit with an electrically connected load based on a noise in a high frequency band superimposed on an alternating current power source supplied to the circuit, the discharge detector includes: a high pass filter configured to extract a frequency component in the high frequency band from the alternating current power source; an amplifier configured to amplify an output of the high pass filter; a smoothing section configured to smooth an output of the amplifier; a phase division section configured to specify a peak time domain including time before and after a peak value and a zero cross time domain including time before and after a 0 value based on a value in one cycle of a voltage or current of the alternating current power source; and a determination section configured to determine whether discharge has occurred based on a difference between a first output of the smoothing section in the peak time domain and a second output of the smoothing section in the zero cross time domain.

It is preferred that, in the discharge detector of the present invention, wherein the determination section executes: process of repeatedly calculating the difference between the first output and the second output corresponding to a plurality of continuous cycles of the voltage or current of the alternating current power source; process of comparing each value of the repeatedly calculated differences with a threshold; and process of determining that discharge has occurred if the difference values of the threshold or more continue.

It is preferred that the discharge detector of the present invention further includes a plurality of the high pass filters electrically connected to a plurality of the circuits, respectively, wherein each of the plurality of the high pass filters extracts the frequency component in the high frequency band from the alternating current power source supplied to the respective circuits; the determination section executes: process of repeatedly calculating the difference between the first output and the second output corresponding to each of the high pass filters; process of calculating a sum or average value of the repeatedly calculated difference values corresponding to each of the high pass filters; and process of specifying the circuit in which the discharge has occurred by comparing the sum or average values corresponding to the respective high pass filters.

It is preferred that, in the discharge detector of the present invention, the phase division section is configured to be capable of adjusting lengths of the peak time domain and the zero cross time domain.

It is preferred that, in the discharge detector of the present invention, the phase division section is capable of specifying two of the peak time domains and two of the zero cross time domains corresponding to approximate one cycle of the voltage or current of the alternating current power source by outputting and/or not outputting a pulse in a timing of beginning and/or end of the peak time domain and/or the zero cross time domain.

It is preferred that, in the discharge detector of the present invention, the determination section executes: process of comparing a value of the difference between the first output and the second output with a first threshold; process of comparing the difference value with a second threshold if the difference value is the first threshold or more; and process of determining that discharge has occurred if the difference value is the second threshold or more.

It is preferred that, in the discharge detector of the present invention, the determination section determines a relative distance to a location of discharge occurrence and/or relative magnitude of the discharge based on the first output in the peak time domain of a cathode and the first output in the peak time domain of an anode included in at least one cycle of the voltage or current of the alternating current power source.

It is preferred that, in the discharge detector of the present invention, the determination section determines the relative distance to the location of discharge occurrence and/or the relative magnitude of the discharge based on: a difference between the first output in the peak time domain of the cathode and the second output in the zero cross time domain of the cathode immediately before or immediately after the peak time domain; and a difference between the first output in the peak time domain of the anode and the second output in the zero cross time domain of the anode immediately before or immediately after the peak time domain.

It is preferred that, in the discharge detector of the present invention, the determination section executes: process of comparing the second output with a third threshold; and process of reporting that the determination of whether discharge has occurred cannot be executed if the second output is the third threshold or more.

It is preferred that, in the discharge detector of the present invention, the determination section executes: process of comparing the second output with a third threshold; and process of reducing an amplification factor of the amplifier if the second output is the third threshold or more.

It is preferred that, in the discharge detector of the present invention, the determination section executes: process of repeatedly calculating the difference between the first output and the second output based on values in a plurality of continuous cycles of the voltage or current of the alternating current power source; process of comparing each value of the repeatedly calculated differences with a threshold; process of starting measurement of a first predetermined time if the difference value is the threshold or more; process of determining that discharge has occurred if the difference values of the threshold or more continue while the first predetermined time passes; process of starting measurement of a second predetermined time shorter than the first predetermined time if the difference value is less than the threshold while the first predetermined time passes; process of terminating the measurement of the first predetermined time midway if the difference value is not the threshold or more while the second predetermined time passes; and process of determining that discharge has occurred if the difference value is the threshold or more while the second predetermined time passes and the difference values of the threshold or more continue until the first predetermined time passes.

It is preferred that, in the discharge detector of the present invention, the determination section executes: process of repeatedly calculating the difference between the first output and the second output based on values in a plurality of continuous cycles of the voltage or current of the alternating current power source; process of comparing each value of the repeatedly calculated differences with a threshold; process of starting measurement of a first predetermined time if the difference value is the threshold or more; process of determining that discharge has occurred if the difference values of the threshold or more continue until the first predetermined time passes; process of counting number of calculating the difference value of less than the threshold if the difference value is less than the threshold while the first predetermined time passes; process of terminating the measurement of the first predetermined time midway if the number of calculating the difference value of less than the threshold reaches a predetermined number of times set in advance; and process of determining that discharge has occurred if the difference value is the threshold or more before the number of calculating the difference value of less than the threshold reaches the predetermined number of times and the difference values of the threshold or more continue until the first predetermined time passes.

Effects of the Invention

The discharge detector of the present invention is capable of improving discharge detection accuracy and specifying a circuit in which the discharge occurred.

The discharge detector of the present invention is also capable of accurately detecting that discharge has occurred even if the level of the noise generated by discharge instantaneously falls below a threshold.

DESCRIPTION OF THE INVENTION

A discharge detector according to an embodiment of the present invention is described below with reference to the drawings.

1. Configuration of Discharge Detector

Figure 1:
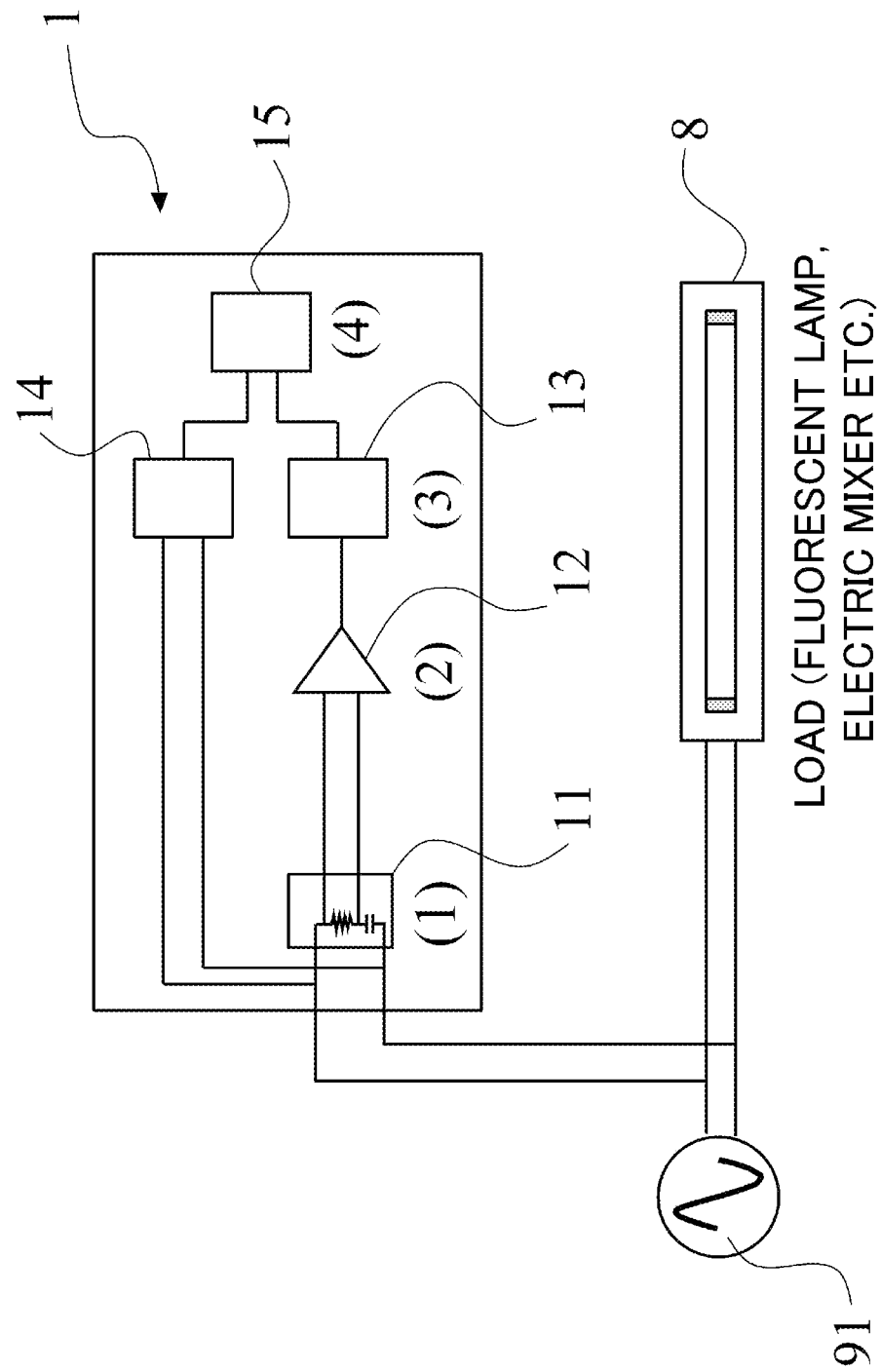
FIG. 1 is a schematic diagram illustrating a discharge detector according to an embodiment of the present invention.

FIG. 1 illustrates a discharge detector 1 in the present embodiment and a circuit to which the discharge detector 1 is electrically connected. To the circuit, an alternating current power source 91 and a load 8 are electrically connected. For example, the circuit is indoor wiring. The alternating current power source 91 is the utility power supplied from outdoor wiring to the indoor wiring. The load 8 includes various devices that operate by consuming power, such as a fluorescent lamp and an electric mixer. The discharge detector 1 detects discharge occurred in the circuit based on a noise in a high frequency band superimposed on the alternating current power source 91 supplied to the circuit. The discharge detector 1 includes a high pass filter 11, an amplifier 12, a smoothing section 13, a phase division section 14, and a determination section 15.

The high pass filter 11 is electrically connected to the circuit to extract a frequency component in a high frequency band from the alternating current power source 91. That is, the high pass filter 11 passes, without attenuation, frequency components higher than a cutoff frequency among the frequency components of the alternating current power source 91. Thus, a noise in a high frequency band superimposed on the alternating current power source 91 is extracted (refer to (1) in FIG. 5).

The amplifier 12 is electrically connected to the output side of the high pass filter 11. The amplifier 12 amplifies the noise extracted by the high pass filter 11. For example, the amplifier 12 amplifies the noise extracted by the high pass filter 11 20 times. The noise amplified by the amplifier 12 generates a waveform to alternately repeat "0" and "1" at short intervals (refer to (2) in FIG. 5). It is difficult to determine whether discharge has occurred based on such a short intermittent waveform.

The smoothing section 13 is electrically connected to the output side of the amplifier 12. The smoothing section 13 smooths the waveform of the noise amplified by the amplifier 12. The smoothing is, for example, process of connecting peaks in the waveform of the amplified noise. The smoothed noise waveform forms a line connecting the peaks of "1" in the amplified noise waveform (refer to (3) in FIG. 5). It should be noted that the smoothing section 13 may smooth the noise waveform by holding the maximum value (peak hold) of the noise amplified by the amplifier 12. The smoothing of the noise waveform by the smoothing section 13 allows instantaneous variation in signal level not to affect results of determination of the determination section 15.

The phase division section 14 is electrically connected to the circuit. The phase division section 14 is configured to specify a peak time domain including time before and after a peak value and a zero cross time domain including time before and after a 0 value based on values in one cycle of a voltage or current of the alternating current power source 91 illustrated in FIG. 2. The phase division section 14 outputs, for example, a pulse as illustrated in FIG. 3 in a predetermined timing to be capable of specifying peak time domains A, A', . . . and zero cross time domains B, B', . . . over a plurality of cycles. The method for specifying the peak time domain and the zero cross time domain by the phase division section 14 is detailed later.

As the determination section 15, an arithmetic device, such as a microcontroller unit (MCU), a microcomputer, and a processor, for example, is used. The determination section 15 is electrically connected to on each output side of the smoothing section 13 and the phase division section 14. Each output of the smoothing section 13 and the phase division section 14 is input to the determination section 15.

That is, to the determination section 15, the output of the noise waveform smoothed by the smoothing section 13 is input. In addition, to the determination section 15, the pulse output from the phase division section 14 in a predetermined timing is input.

As illustrated in FIG. 3, the determination section 15 specifies the peak time domain A and the zero cross time domain B based on the pulse input from the phase division section 14. The determination section 15 then calculates a value of the difference between a first output of the smoothing section 13 in the peak time domain A and a second output of the smoothing section 13 in the zero cross time domain B. The determination section 15 determines whether discharge has occurred based on the value of the difference between the first output and the second output. Subsequently, the determination section 15 specifies the peak time domains A, A', . . . and the zero cross time domains B, B', . . . over a plurality of cycles of the voltage or current of the alternating current power source 91 to repeat calculation of the value of the difference between the first output and the second output.

2. Principle of Discharge Detection

In this section, the principle of discharge detection by the discharge detector 1 is described. The determination section 15 of the discharge detector 1 is capable of distinguishing a noise generated by discharge from a noise generated by normal operation of a load and detecting occurrence of discharge with high accuracy.

Figure 27:
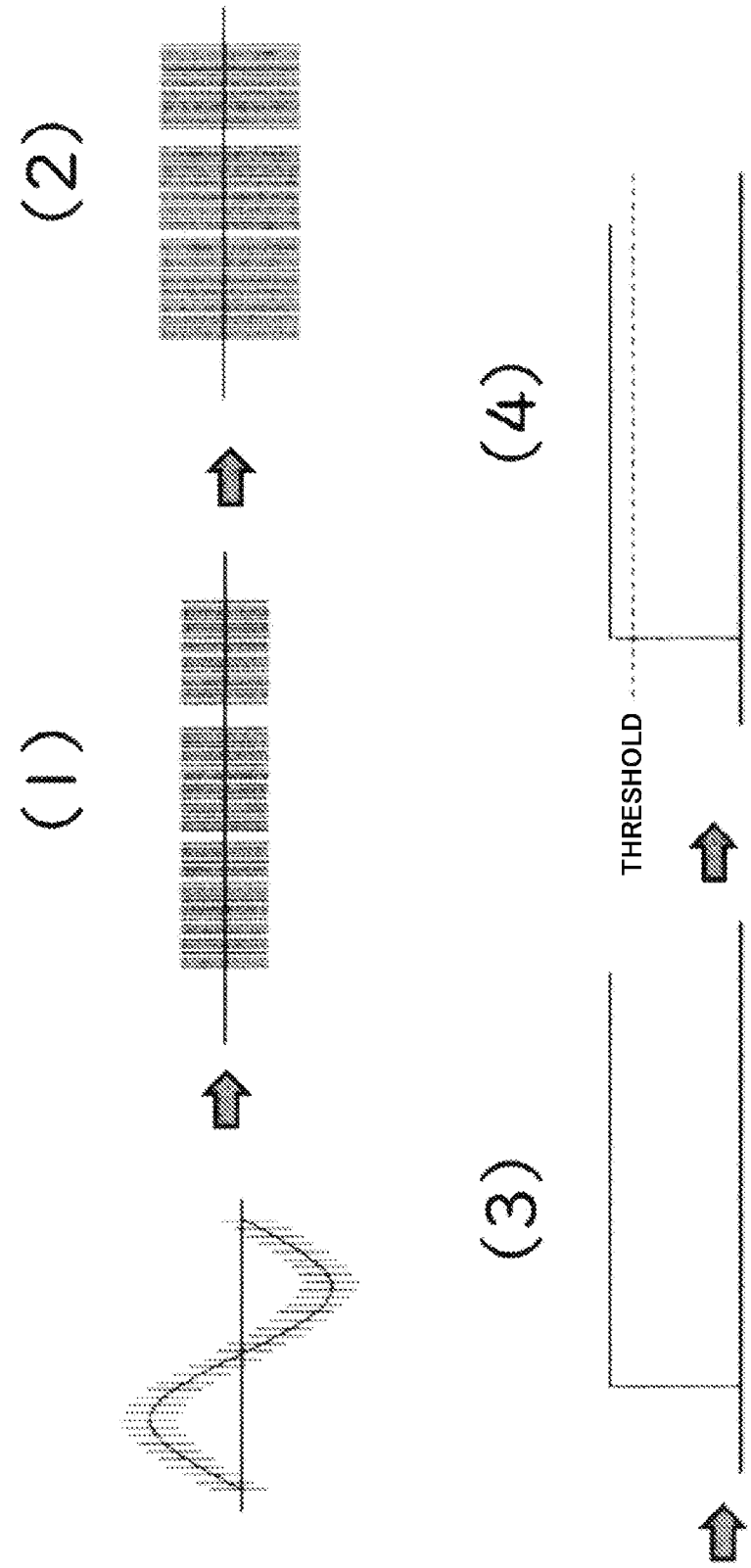
FIG. 27 is a waveform diagram illustrating the waveform of the alternating current power source, a waveform of a noise extracted from the alternating current power source, a waveform of an amplified noise, and a waveform of a smoothed noise.

As illustrated in FIG. 27, some devices provided with a motor, such as an electric mixer and an electric drill, for example, continuously generate a noise more than a threshold during operation. Such a noise generated by normal operation of a load is smoothed by the smoothing section 13 generates a waveform as illustrated in (3) in FIG. 27. As illustrated in (4) in FIG. 27, if the noise is generated by normal operation of a load, the output of the smoothing section 13 is continuously more than a threshold from the start of the operation of the load.

Figure 2:
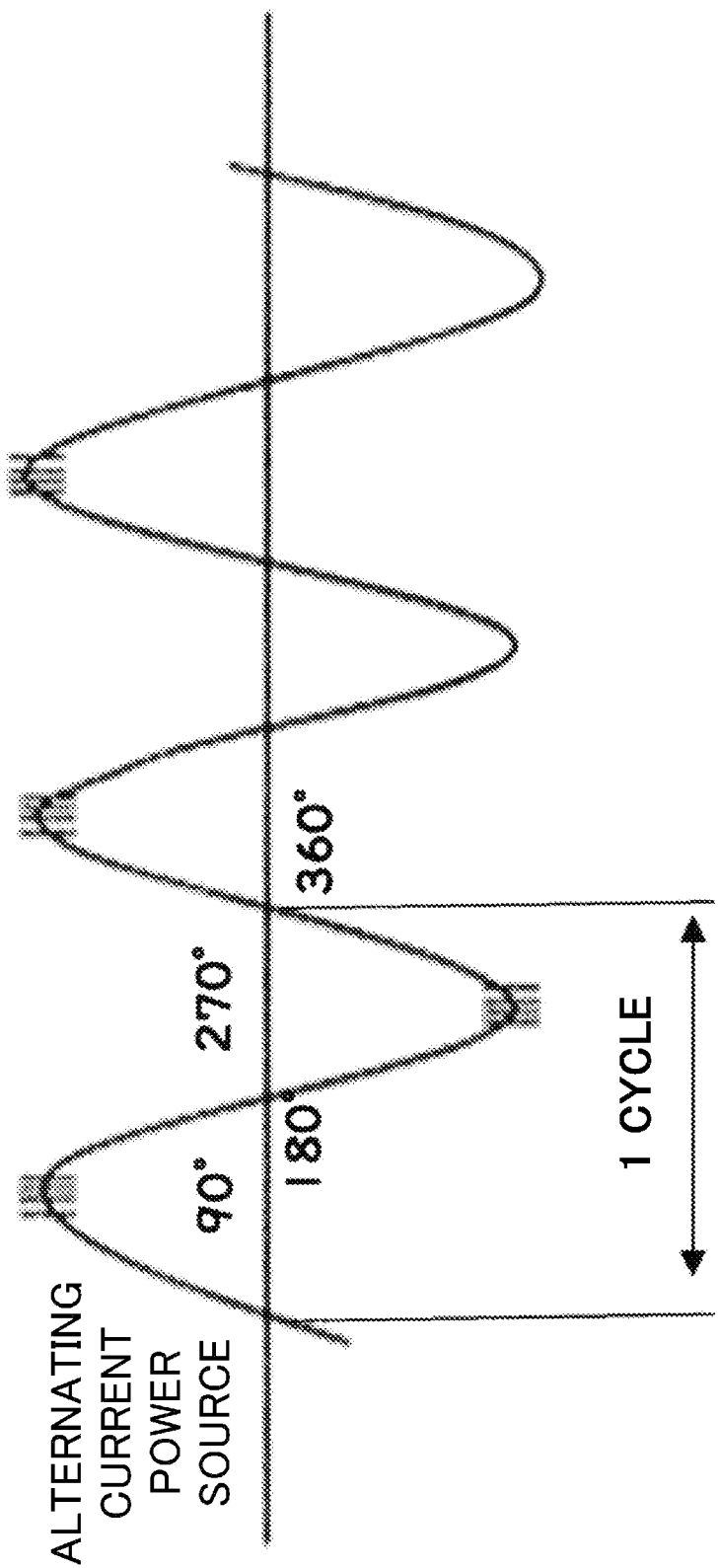
FIG. 2 is a waveform diagram illustrating an alternating current power source on which the noise in a high frequency band generated by discharge is superimposed.
Figure 3:
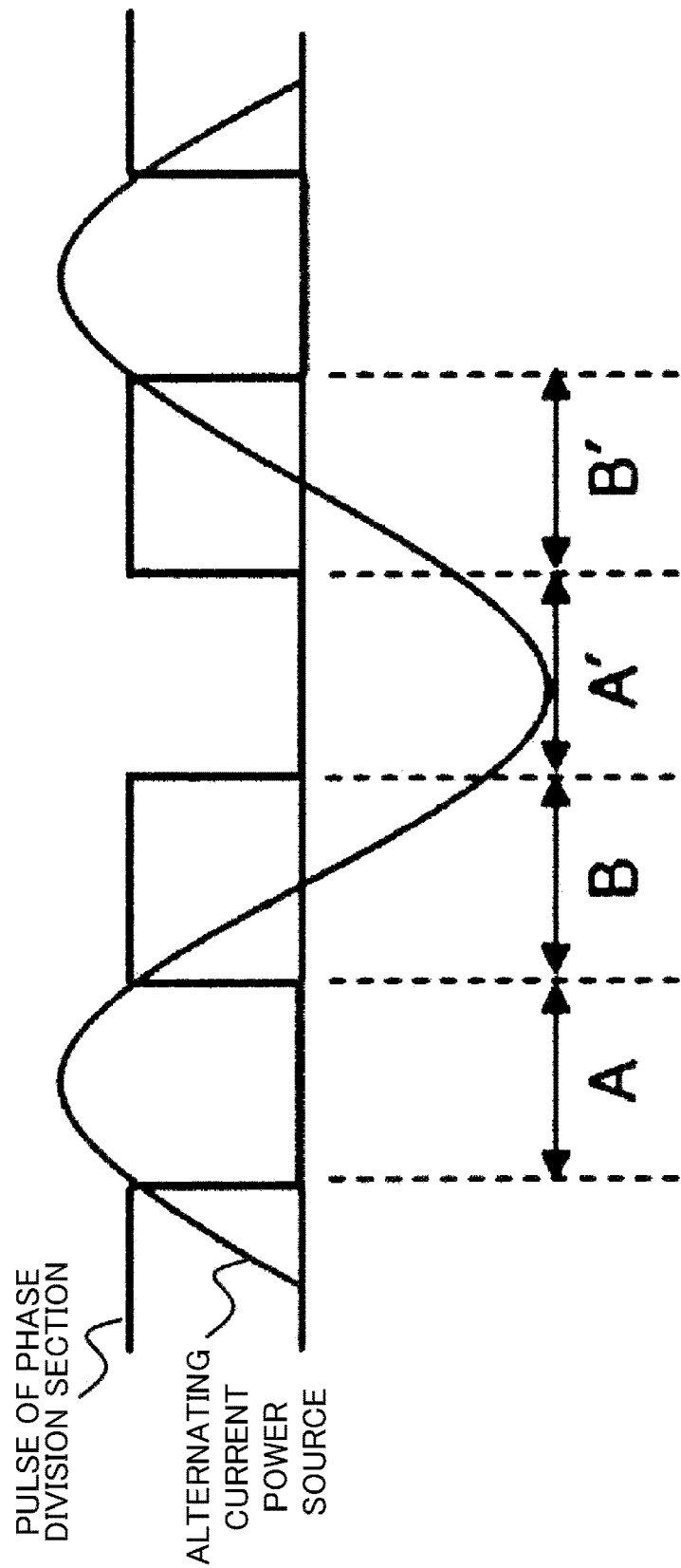
FIG. 3 is a waveform diagram illustrating a waveform of the alternating current power source and a waveform of a pulse output from a phase division section.

In contrast, as illustrated in FIG. 2, if discharge has occurred by an accident, such as tracking, a short circuit, and disconnection, the noise generated by the discharge notably appears before and after peak values in the waveform of the voltage or current of the alternating current power source 91 and does not appear before and after 0 values. Given that one cycle of the waveform of the voltage or current is 360 degrees, the noise generated by discharge notably appears before and after 90° and before and after 270°. In other words, if the alternating current power source 91 has a frequency of 60 Hz, one cycle of the waveform of the voltage or current is $\frac{1}{60}$ s=16.7 ms. The noise generated by discharge notably appears before and after the time of 4.2 ms and before and after the time of 12.5 ms from the 0 value. Accordingly, it is possible to determine whether the noise is generated by discharge based on the difference between the first output of the smoothing section 13 before and after each peak value and the second output of the smoothing section 13 before and after each 0 value. That is, if the noise is generated by discharge, the value of the difference between the first output and the second output of the smoothing section 13 is large. In contrast, if the noise is generated by normal operation of a load, the value of the difference between the first output and the second output of the smoothing section 13 is small.

To realize the principle of discharge detection described above, the phase division section 14 outputs a pulse to the determination section 15 to specify the peak time domains including time before and after the peak values and the zero cross time domains including time before and after the 0 values based on the values in one cycle of the voltage or current of the alternating current power source 91. For example, as illustrated in FIG. 3, the phase division section 14 does not output a pulse in the peak time domains A, A' and outputs a pulse in the zero cross time domains B, B'. In the waveform of the voltage or current of the alternating current power source 91 illustrated in FIG. 2, the peak time domain A corresponds to a domain of phase angles of 45 degrees or more and less than 135 degrees. The zero cross time domain B corresponds to a domain of phase angles of 135 degrees or more and less than 225 degrees. The peak domain A' corresponds to a domain of phase angles of 225 degrees or more and less than 315 degrees. The zero cross time domain B' corresponds to a domain of 315 degrees or more and less than 405 degrees. In short, the phase division section 14 in the present embodiment divides one cycle of the voltage or current of the alternating current power source 91 into four domains.

It should be noted that the widths of the peak time domains A, A' and the zero cross time domains B, B' may be narrower or wider under the condition of including the time of the peak value and the 0 value. The peak time domains A, A' and the zero cross time domains B, B' may be represented by, not limited to the phase angle, time passed from the 0 value.

The determination section 15 specifies the peak time domain A and the zero cross time domain B based on the pulse input from the phase division section 14. For example, the determination section 15 respectively calculates an average value of the first outputs of the smoothing section 13 in the peak time domain A and an average value of the second outputs of the smoothing section 13 in the zero cross time domain B. The determination section 15 then calculates a value of the difference between the average value of the first outputs and the average value of the second outputs. Based on this difference value, the determination section 15 determines whether discharge has occurred. For example, the determination section 15 determines that discharge has occurred if the difference value is the threshold or more. Meanwhile, the determination section 15 does not determine that discharge has occurred if the difference value is less than the threshold. The difference value of less than the threshold means that the noise superimposed on the alternating current power source 91 is generated by normal operation of a load.

3. Modes of Pulse Output from Phase Division Section

Figure 4:
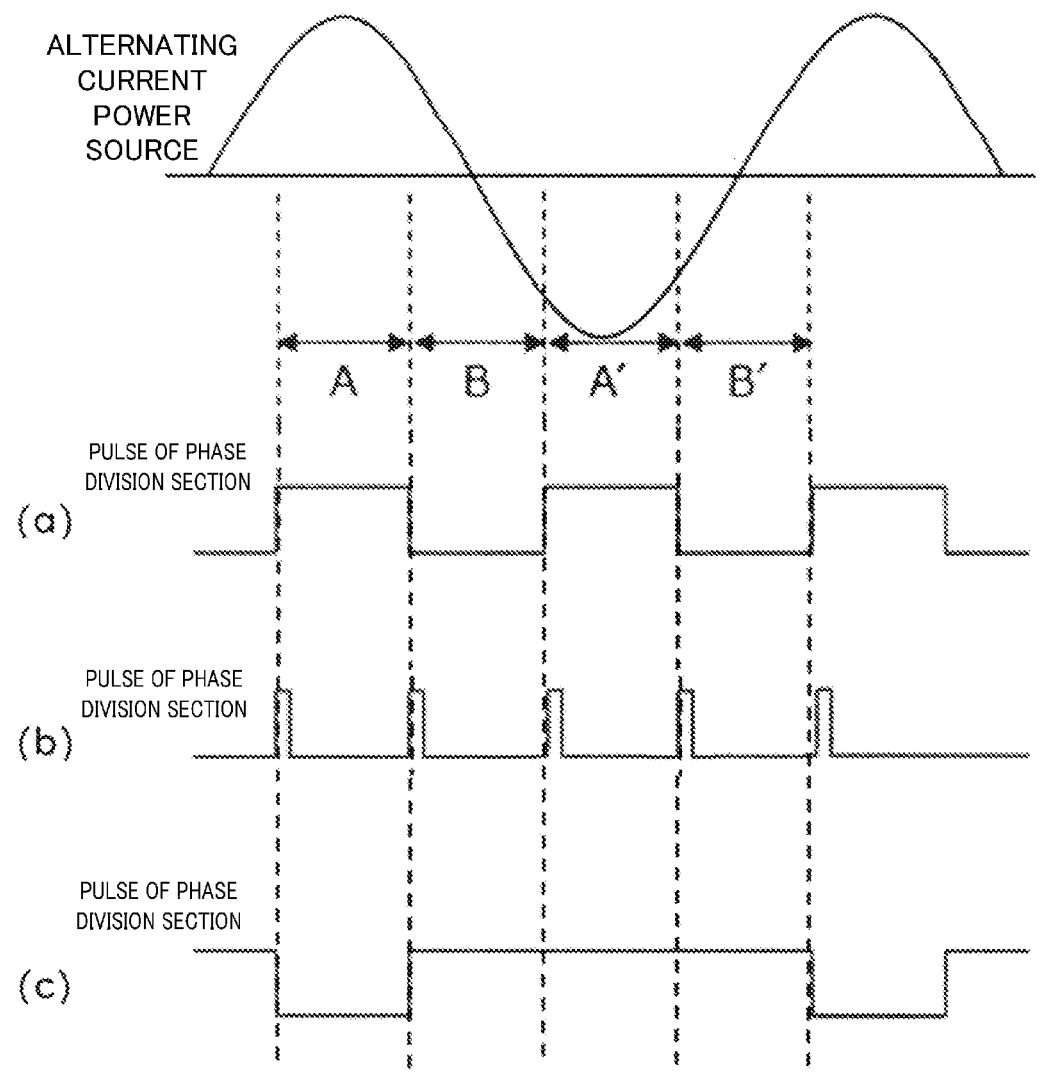
FIG. 4 is a timing diagram illustrating the waveform of the alternating current power source and modes of the pulse output from the phase division section.

The phase division section 14 outputs a pulse in various modes to allow the determination section 15 to specify the peak time domains A, A' and the zero cross time domains B, B'. FIGS. 4(*a*) through 4(*c*) illustrate specific examples of the mode of the pulse output from the phase division section 14.

As illustrated in FIG. 4(*a*), the phase division section 14 outputs a pulse in the peak time domain A of the cathode and the peak time domain A' of the anode and does not output a pulse in the zero cross time domains B, B'. The determination section 15 processes the output of the smoothing section 13 while the pulse is output as the first output. The determination section 15 processes the output of the smoothing section 13 while the pulse is not output as the second output.

As illustrated in FIG. 4(*b*), the phase division section 14 outputs a short pulse in respective timings of beginning of the peak time domains A, A' and the zero cross time domains B, B'. The determination section 15 processes the output of the smoothing section 13 during the time from the first pulse output to the second pulse output as the first output. The determination section 15 then processes the output of the smoothing section 13 during the time from the second pulse output to the third pulse output as the second output. The determination section 15 then processes the output of the smoothing section 13 during the time from the third pulse output to the fourth pulse output as the first output. The determination section 15 then processes the output of the smoothing section 13 during the time from the fourth pulse output to the fifth pulse output as the second output.

As illustrated in FIG. 4(*c*), the phase division section 14 does not output a pulse in the peak time domain A of the cathode included in one cycle of the voltage or current of the alternating current power source 91. The determination section 15 starts measuring the time from the point of outputting no pulse. The determination section 15 then processes the output of the smoothing section 13 for 4.2 ms from the point of outputting no pulse as the first output. The determination section 15 then processes the output of the smoothing section 13 during the time from 4.2 ms to 8.4 ms as the second output. The determination section 15 then processes the output of the smoothing section 13 during the time from 8.4 ms to 12.6 ms as the first output. The determination section 15 then processes the output of the smoothing section 13 during the time from 12.6 ms to 16.7 ms as the second output.

4. Process by Discharge Detector

Figure 5:
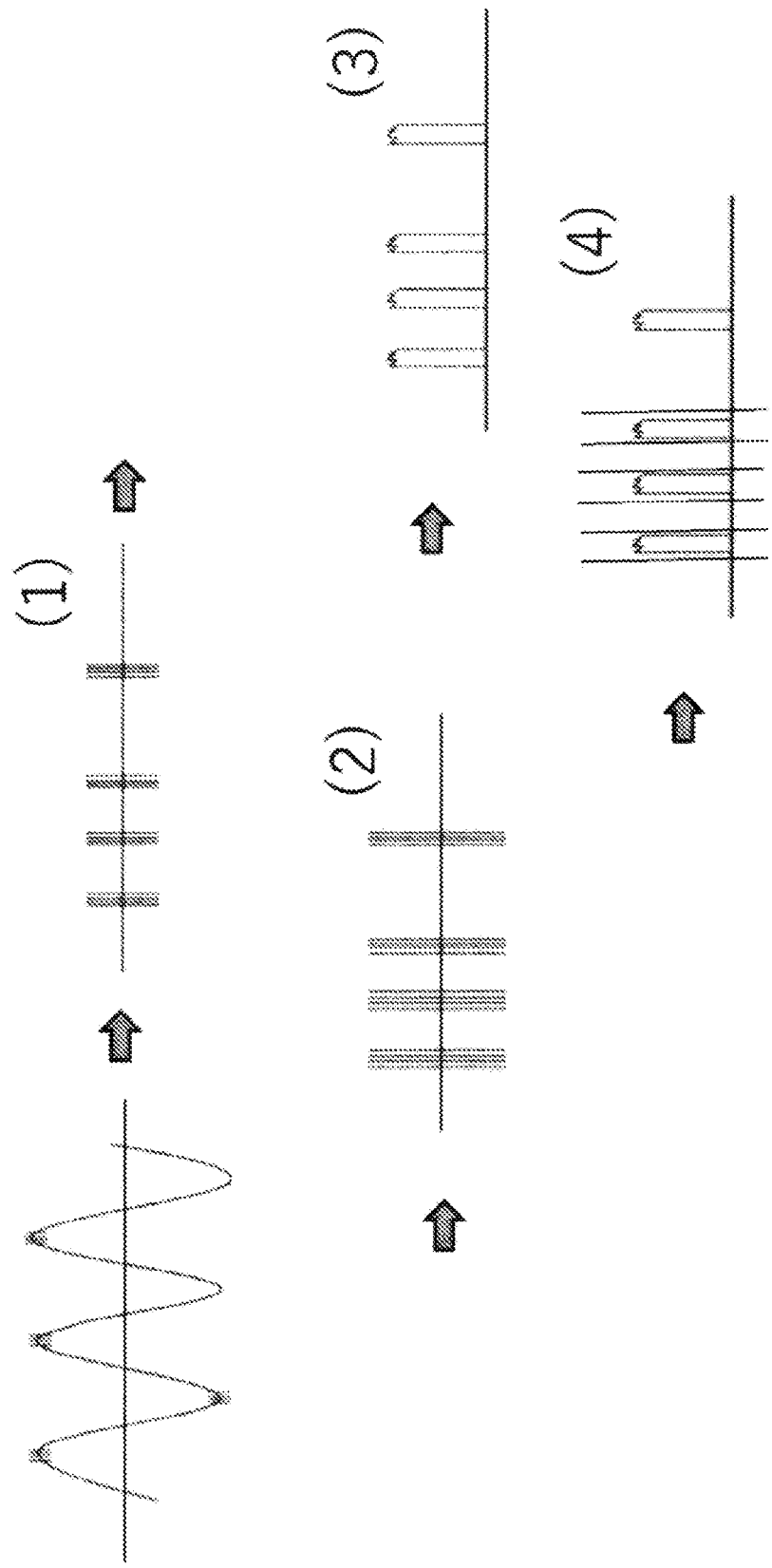
FIG. 5 is a waveform diagram illustrating the waveform of the alternating current power source, a waveform of a noise extracted from the alternating current power source, a waveform of an amplified noise, and a waveform of a smoothed noise.

FIG. 5 illustrates the waveforms of the noise extracted from the voltage or current of the alternating current power source 91, amplified, and smoothed by the discharge detector 1. It should be noted that what are illustrated in FIG. 5 are the waveforms of a noise generated by discharge. The signs (1), (2), (3), and (4) in FIGS. 1 and 5 indicate that the components in FIG. 1 correspond to the output waveforms in FIG. 5. With reference to (1) through (4) in FIGS. 1 and 5, process of each component of the discharge detector 1 is described below.

(1) A sine wave illustrated at the beginning of FIG. 5 is a voltage waveform of the alternating current power source 91 on which a noise in a high frequency band is superimposed. As illustrated in this sine wave, the noise in a high frequency band appears before and after the peaks in the voltage waveform of the alternating current power source 91. The high pass filter 11 passes, without attenuation, frequency components higher than a cutoff frequency among the frequency components of the alternating current power source 91. The noise in a high frequency band superimposed on the alternating current power source 91 is thus extracted.

(2) The noise extracted by the high pass filter 11 is amplified by the amplifier 12. The amplifier 12 amplifies the extracted noise, for example, 20 times. The noise amplified by the amplifier 12 generates a waveform to alternately repeat "0" and "1" at short intervals. It is difficult to determine whether discharge has occurred based on such a short intermittent waveform.

(3) The smoothing section 13 smooths the waveform of the noise amplified by the amplifier 12. The smoothing is, for example, process of connecting peaks in the waveform of the amplified noise. The smoothed noise waveform forms a line connecting the peaks of "1" in the amplified noise waveform.

(4) The determination section 15 specifies the peak time domains A, A' and the zero cross time domains B, B' based on the pulse output from the phase division section 14. The determination section 15 calculates an average value of the first outputs of the smoothing section 13 in the peak time domain A. The determination section 15 then calculates an average value of the second outputs of the smoothing section 13 in the zero cross time domain B. The determination section 15 then calculates a value of the difference between the average value of the first outputs and the average value of the second outputs. The determination section 15 then calculates an average value of the first outputs, an average value of the second outputs, and a value of the difference between these average values similarly in the peak time domain A' and the zero cross time domain B'. The determination section 15 then determines whether discharge has occurred based on the difference value.

4.1 Determination of Discharge Occurrence by Determination Section

Figure 6:
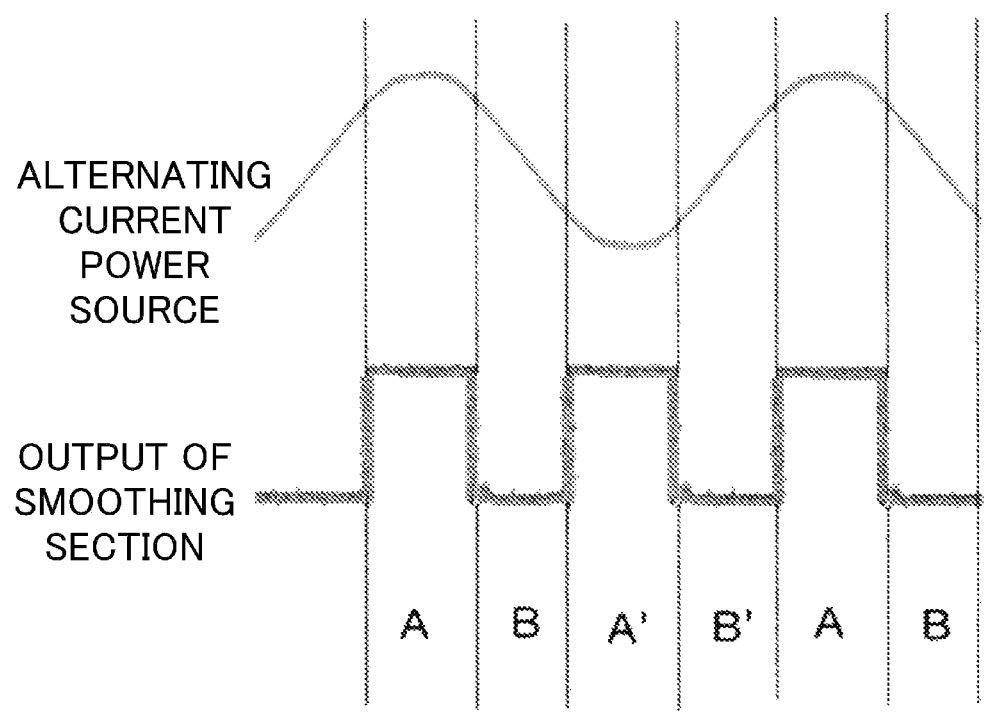
FIG. 6 is a waveform diagram illustrating the waveform of the alternating current power source and an output waveform of a smoothing section.

FIG. 6 illustrates the waveform of the alternating current power source 91 and an output waveform of the smoothing section 13. The output waveform of the smoothing section 13 illustrated in FIG. 6 is obtained by smoothing the waveform of a noise generated by discharge. As described above, the noise in a high frequency band generated by discharge appears before and after the peaks in the waveform of the alternating current power source 91. Accordingly, as illustrated in FIG. 6, the values of the first outputs of the smoothing section 13 in the peak time domains A, A' are large. In contrast, the values of the second outputs of the smoothing section 13 in the zero cross time domains B, B' is 0 or close to 0.

The determination section 15 obtains the outputs of the smoothing section 13 in time series respectively in the peak time domain A and the zero cross time domain B of the cathode and the peak time domain A' and the zero cross time domain B' of the anode corresponding to a plurality of cycles of the alternating current power source 91. The determination section 15 executes arithmetic process described below for each cycle of the alternating current power source 91 while a predetermined time set in advance passes.

Figure 7:
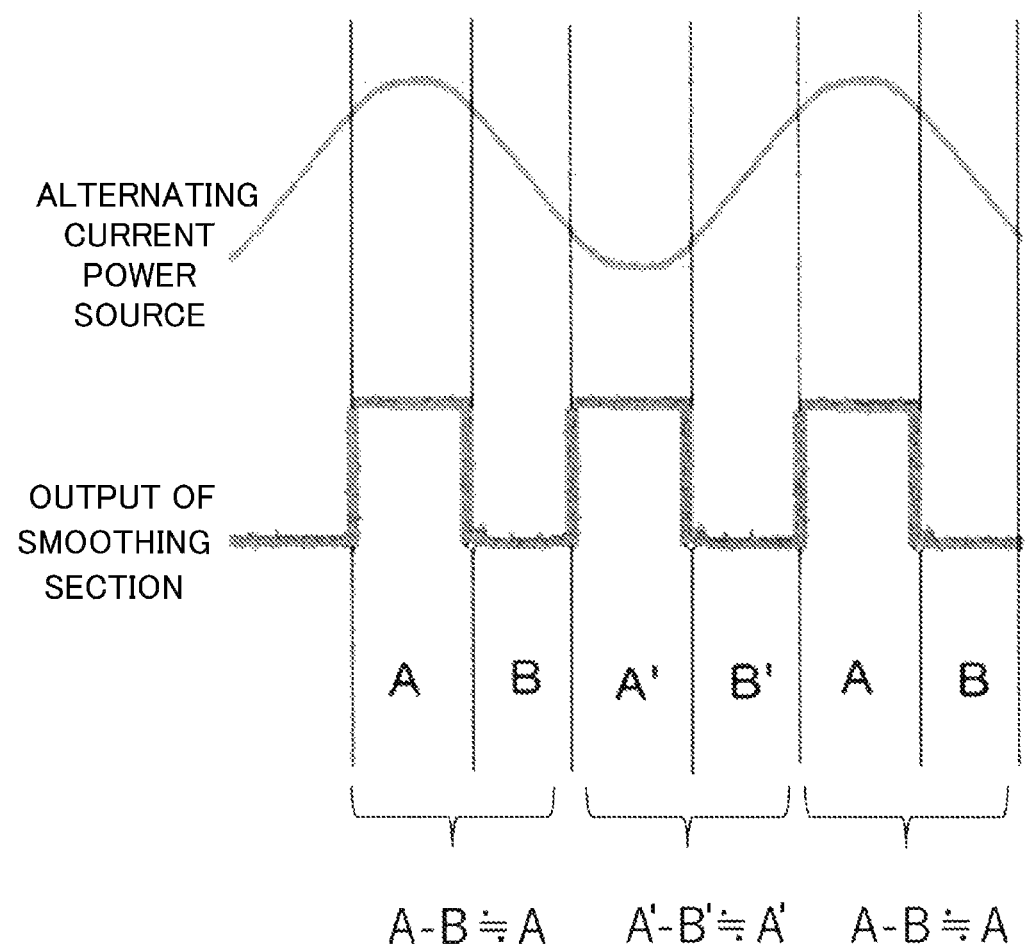
FIG. 7 is a waveform diagram illustrating the waveform of the alternating current power source and the output waveform of the smoothing section.

As illustrated in FIG. 7, the determination section 15 calculates an average value A of the first outputs and an average value B of the second outputs in the peak time domain A and the zero cross time domain B of the cathode. The determination section 15 then calculates a value of the difference between the average value A and the average value B. If the noise is caused by discharge, the average value B is 0 or a value close to 0. Accordingly, the value of the difference between the average value A and the average value B is the same value as the average value A or a value close to the average value A. The determination section 15 then compares the difference value between the average value A and the average value B with a threshold set in advance. The determination section 15 then executes arithmetic process similar as above for the outputs of the smoothing section 13 respectively in the peak time domain A' and the zero cross time domain B' of the anode and compares a value of the difference between an average value A' and an average value B' with the threshold.

The determination section 15 determines that discharge has occurred if both the difference value between the average value A and the average value B and the difference value between the average value A' and the average value B' calculated while the predetermined time passes are the threshold or more.

It should be noted that the threshold as a criterion for the determination of whether discharge has occurred is preferably, but not particularly limited to, a value at least allowing thorough detection of hazardous discharge.

In addition, in FIG. 7, it is theoretically possible to determine whether discharge has occurred based on a result of the arithmetic process (A-B) corresponding to half cycle of the alternating current power source 91 or a result of the arithmetic process (A-B and A'-B') corresponding to one cycle of the alternating current power source 91. However, as the determination method in the present embodiment described above, it is preferred to determine that discharge has occurred if the difference values of the threshold or more continue upon execution of the arithmetic process (A-B, A'-B', A-B, . . . ) corresponding to a plurality of cycles of the alternating current power source 91 while the predetermined time passes. The determination method in the present embodiment described above allows highly accurate determination of whether discharge has occurred.

Still in addition, in the determination method in the present embodiment described above, whether discharge has occurred is determined based on the difference value between the average values A, A' of the first outputs and the average values B, B' of the second outputs of the smoothing section 13, whereas the values to be based on is not limited to the average values. For example, it is also possible to determine whether discharge has occurred based on a difference value between a sum value of the first outputs and a sum value of the second outputs of the smoothing section 13. As another example, a difference value between the first output and the second output of the smoothing section 13 for each cycle of the alternating current power source 91 is calculated. Then, it is also possible to determine whether discharge has occurred by comparing an average value or a sum value of difference values obtained within the predetermined time with the threshold.

4.2 Determination of Nonoccurrence of Discharge by Determination Section

Figure 8:
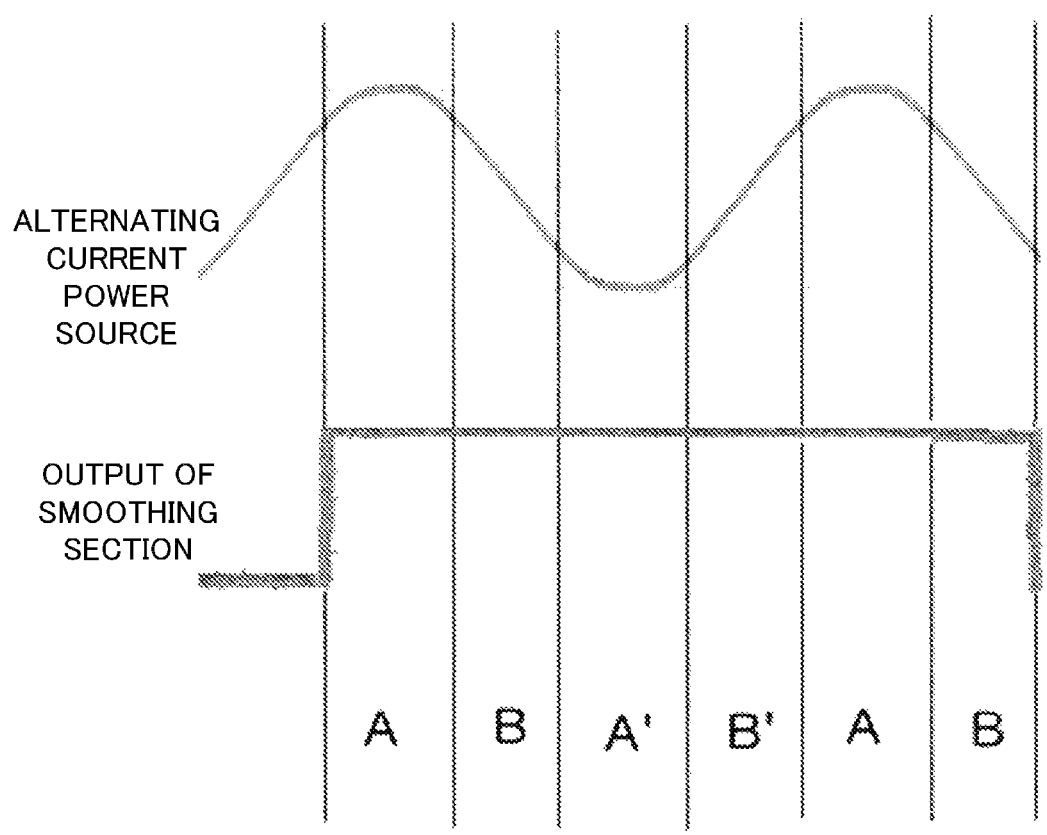
FIG. 8 is a waveform diagram illustrating the waveform of the alternating current power source and an output waveform of the smoothing section.

FIG. 8 illustrates the waveform of the alternating current power source 91 and an output waveform of the smoothing section 13. The output waveform of the smoothing section 13 illustrated in FIG. 8 is obtained by smoothing the waveform of a noise generated by normal operation of a load. As described above, the noise generated by normal operation of a load appears over the entire alternating current power source 91 including the peaks in the waveform. Accordingly, as illustrated in FIG. 8, both outputs of the smoothing section 13 in the peak time domains A, A' and the zero cross time domains B, B' are the same values. Thus, both the average values A, A' of the first outputs and the average values B, B' of the second outputs of the smoothing section 13 are the same values. Then, both the difference value between the average value A and the average value B and the difference value between the average value A' and the average value B' are 0 or values close to 0. As a result, both the difference value between the average value A and the average value B and the difference value between the average value A' and the average value B' are less than the threshold, and the determination section 15 determines that discharge has not occurred. In short, the determination section 15 does not erroneously determine that discharge has occurred based on the noise generated by normal operation of a load.

4.3 Another Determination Method 1 by Determination Section

Figure 9:
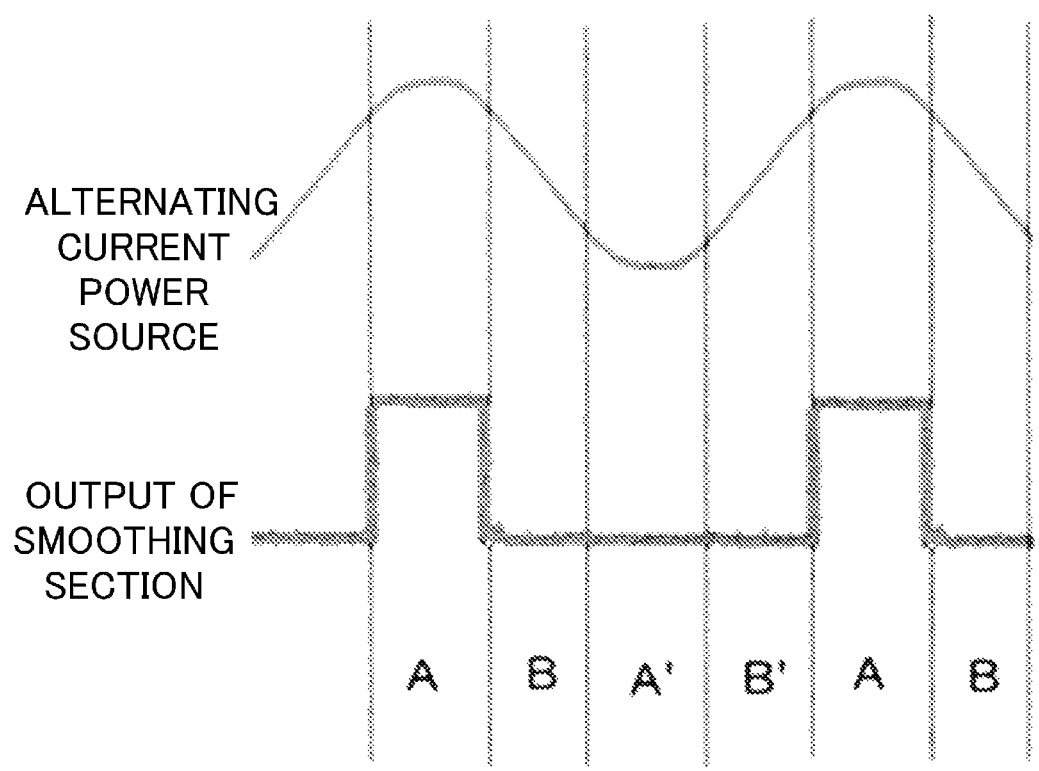
FIG. 9 is a waveform diagram illustrating the waveform of the alternating current power source and an output waveform of the smoothing section.

For example, as illustrated in FIG. 9, the determination section 15 may determine whether discharge has occurred based on a noise appearing in either one of the peak time domain A of the cathode or the peak time domain A' of the anode included in a plurality of cycles of the alternating current power source 91.

The output waveform of the smoothing section 13 illustrated in FIG. 9 indicates a noise generated in a circuit configured with wiring of a single-phase two-wire system. The wiring of a single-phase two-wire system is widely used as, for example, indoor wiring for a general house. The wiring of a single-phase two-wire system is configured with two wires of a live conductor and a neutral conductor. If discharge has occurred due to the load 8, a noise generated by the discharge is output to either one of the live conductor or the neutral conductor. That is, if a cathode and an anode of a plug of the load 8 are correctly connected to the live conductor and the neutral conductor, the noise generated by discharge is output to the live conductor and appears before and after the peaks of the cathode in the waveform of the alternating current power source 91. In contrast, if the cathode and the anode of the plug of the load 8 are wrongly connected to the live conductor and the neutral conductor, the noise generated by discharge is output to the neutral conductor and appears before and after the peaks of the anode in the waveform of the alternating current power source 91. Accordingly, if the discharge detector 1 is provided in the wiring of a single-phase two-wire system, the determination section 15 may determine whether discharge has occurred based on the noise appearing in either one of the peak time domain A of the cathode or the peak time domain A' of the anode included in a plurality of cycles of the alternating current power source 91.

4.4 Another Determination Method 2 by Determination Section

The determination section 15 is capable of more complex determination by comparing the results of the arithmetic process described above with a plurality of thresholds. For example, the determination section 15 executes arithmetic process (A-B, A'-B', A-B, . . . ) corresponding to a plurality of cycles of the alternating current power source 91 and compares the results of the arithmetic process with a first threshold. As a result, if difference values of the first threshold or more continue, the determination section 15 determines that discharge has occurred.

Then, the determination section 15 calculates an average value of the difference values of the first threshold or more. The determination section 15 then compares the average value of the difference values with a second threshold. As a result, if the average value of the difference values is the second threshold or more, the determination section 15 outputs a signal to interrupt a breaker, not shown, electrically connected between the alternating current power source 91 and the circuit. It should be noted that the second threshold is a value greater than the first threshold.

5. Monitoring of Plurality of Circuits Using Plurality of Discharge Detectors

Figure 10:
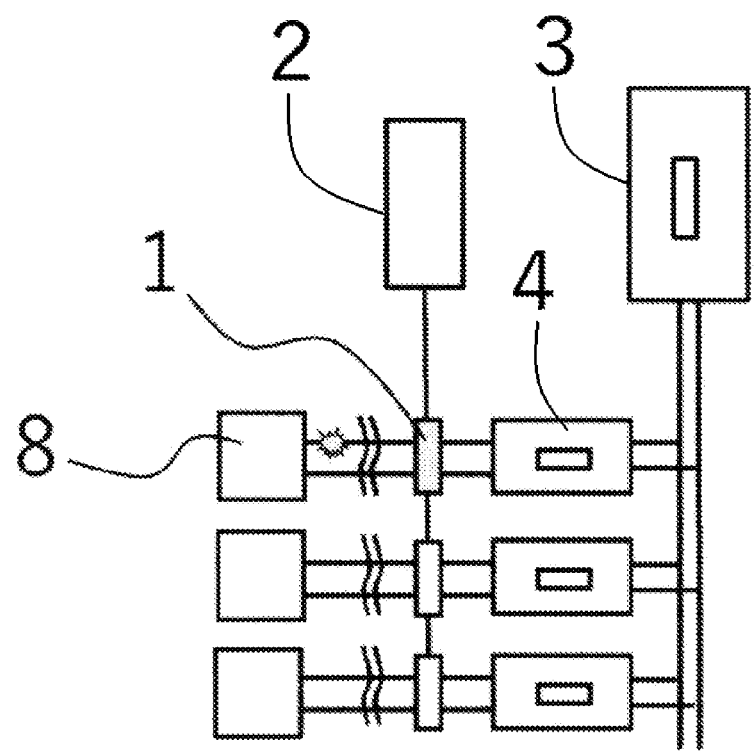
FIG. 10 is a schematic diagram illustrating a distribution board provided with a plurality of discharge detectors.

FIG. 10 illustrates a distribution board provided with a plurality of discharge detectors 1. The distribution board is provided with a main breaker 3 and a plurality of branch breakers 4. The main breaker 3 has a primary side electrically connected to the alternating current power source 91 via outdoor wiring, not shown. The main breaker 3 has a secondary side electrically connected to the plurality of branch breakers 4 via a bus bar. Each of the plurality of branch breakers 4 is electrically connected to a circuit configured with indoor wiring. Each of the plurality of circuits is electrically connected to the load 8. The branch breaker 4 in each circuit has a secondary side electrically connected to the discharge detector 1. All the discharge detectors 1 are electrically connected to a comparison determination section 2. Each discharge detector 1 detects discharge occurred in the respective circuit. A detection result of each discharge detector 1 is output to the comparison determination section 2. The comparison determination section 2 specifies, for example, the circuit in which the discharge occurred, the relative distance to a location of discharge occurrence, and the relative magnitude of the discharge based on the detection result output from each discharge detector 1.

5.1 Specification of Circuit in which Discharge Occurred

Figure 11:
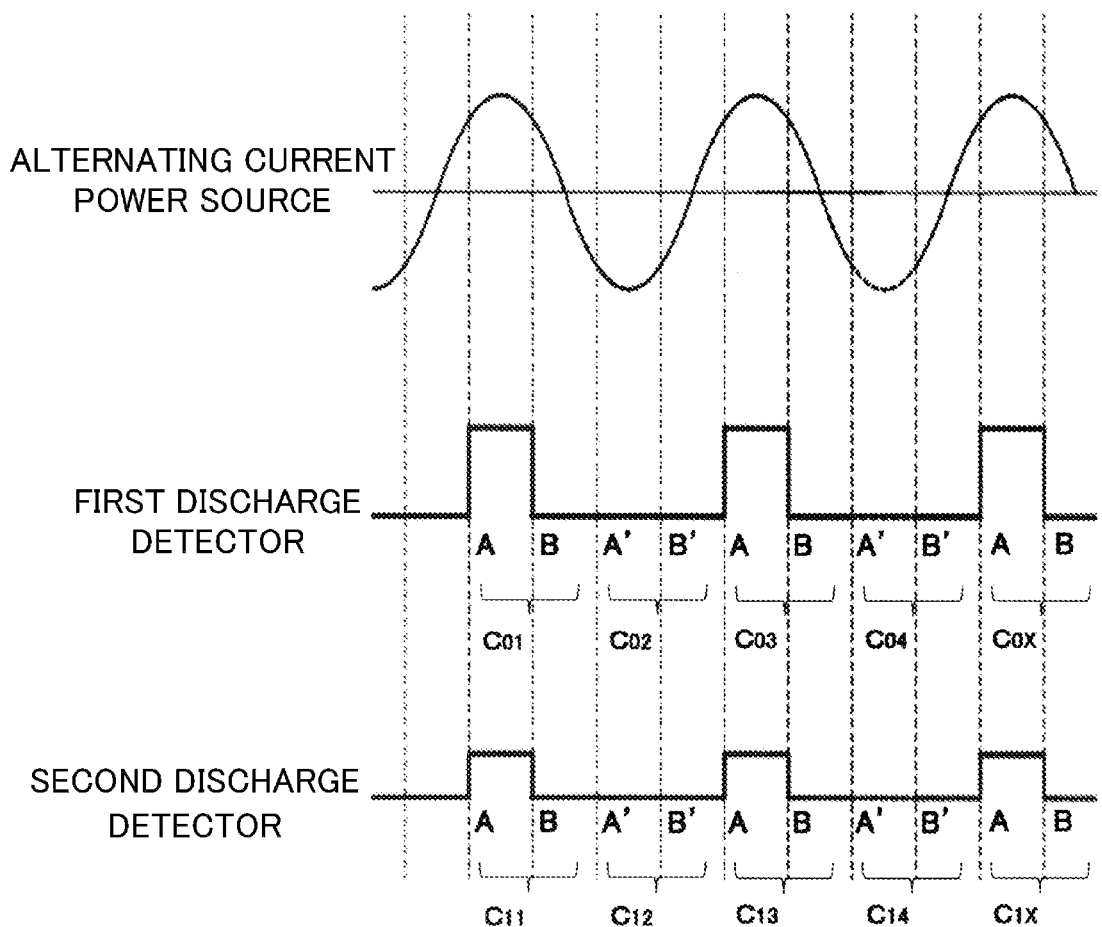
FIG. 11 is a waveform diagram illustrating the waveform of the alternating current power source, an output waveform of a smoothing section of a first discharge detector in FIG. 10, and an output waveform of a smoothing section of a second discharge detector in FIG. 10.

FIG. 11 illustrates the waveform of the alternating current power source 91, an output waveform of the smoothing section 13 of a first discharge detector 1 in FIG. 10, and an output waveform of the smoothing section 13 of a second discharge detector 1 in FIG. 10. The three branch breakers 4 illustrated in FIG. 10 have respective secondary sides electrically connected to the first discharge detector 1, the second discharge detector 1, and a third discharge detector 1 from above in order in FIG. 10. It is assumed that discharge has actually occurred in a first circuit to which the first discharge detector 1 is electrically connected. In this case, the first discharge detector 1 detects discharge occurred in the first circuit. In this situation, if the discharge occurred in the first circuit is large, the noise generated by the discharge is also input to the second discharge detector 1, the third discharge detector 1 and the second discharge detector 1, the third discharge detector 1 also sometimes detects the discharge. Upon this, the comparison determination section 2 illustrated in FIG. 10 specifies the circuit in which the discharge occurred based on the detection result of each discharge detector 1.

As illustrated in FIG. 11, the determination section 15 of the first discharge detector 1 calculates difference values $C_{01}, C_{03}, \ldots, C_{0X}$ between the first output A and the second output B of the smoothing section 13 in the peak time domain A and the zero cross time domain B of the cathode included in a plurality of cycles of the alternating current power source 91. The first discharge detector 1 then calculates a sum value $C_{01}+C_{03}+\ldots C_{0X}$ of the difference values and outputs the calculation result to the comparison determination section 2. As illustrated in FIG. 10, the discharge occurred in the first circuit to which the first discharge detector 1 is electrically connected. The first discharge detector 1 is closer to the source of the discharge than the other discharge detectors 1, and thus has the largest sum value $C_{01}+C_{03}+\ldots C_{0X}$ of the difference values compared with the sum values of the other discharge detectors 1.

Meanwhile, the determination section 15 of the second discharge detector 1 also calculates difference values $C_{11}, C_{13}, \ldots, C_{1X}$ between the first output A and the second output B of the smoothing section 13 in the peak time domain A and the zero cross time domain B of the cathode included in the plurality of cycles of the alternating current power source 91. The second discharge detector 1 then calculates a sum value $C_{11}+C_{13}+\ldots C_{1X}$ of the difference values and outputs the calculation result to the comparison determination section 2. As illustrated in FIG. 10, the noise occurred by discharge reaches a second circuit from the first circuit through the two branch breakers and is input to the second discharge detector 1. Thus, as illustrated in FIG. 11, the value of the first output A of the smoothing section 13 in the second discharge detector 1 is attenuated to half the value of the first output A of the smoothing section 13 in the first discharge detector 1.

The comparison determination section 2 illustrated in FIG. 10 compares the sum value $C_{01}+C_{03}+\ldots C_{0X}$ of the difference values output from the first discharge detector 1 with the sum value $C_{11}+C_{13}+\ldots C_{1X}$ of the difference values output from the second discharge detector 1. As a result, the comparison determination section 2 specifies that discharge has occurred in the first circuit corresponding to the first discharge detector 1 having a larger sum value of the difference values.

In the above description of the embodiment illustrated in FIG. 10, each of the circuits is provided with the discharge detector 1, whereas the configuration is not limited to this example. For example, among the components of the discharge detector 1 illustrated in FIG. 1, each of the circuits may be configured to at least include the high pass filter 11 to process an output of each high pass filter 11 by the amplifier 12, the smoothing section 13, the phase division section 14, and the determination section 15 in common.

6. Determination of Relative Distance to Location of Discharge Occurrence and Relative Magnitude of Discharge The discharge detector 1 in the present embodiment is capable of determining the relative distance to the location of discharge occurrence and the relative magnitude of the discharge based on the first output in the peak time domains A, A' and/or the second output in the zero cross time domains B, B'.

6.1 Determination Based on First Output in Peak Time Domains A, A' of Cathode and Anode As illustrated in FIG. 9, in the circuit configured with the wiring of a single-phase two-wire system, a noise appears in either one of the peak time domain A of the cathode or the peak time domain A' of the anode. However, if discharge has occurred in a location near the discharge detector 1 or the level of the occurred discharge is high, a noise sometimes appears in both the peak time domain domains A, A' of the cathode and the anode. The discharge detector 1 determines the relative distance to the location of the discharge occurrence and the relative magnitude of the discharge based on the first output in the peak time domain A of the cathode and the first output in the peak time domain A' of the anode.

The relative distance to the location of the discharge occurrence and the relative magnitude of the discharge are determined by, for example, the determination section 15 illustrated in FIG. 1. It should be noted that if the plurality of circuits are monitored by the plurality of discharge detectors 1, the comparison determination section 2 illustrated in FIG. 10 may determine the relative distance to the location of the discharge occurrence and the relative magnitude of the discharge.

The determination section 15 obtains the first output in the peak time domain A of the cathode and the first output in the peak time domain A' of the anode from the smoothing section 13 for each cycle of the alternating current power source 91. The determination section 15 then calculates the average value A of the first outputs in the peak time domain A of the cathode and the average value A' of the first outputs in the peak time domain A' of the anode. The determination section 15 then calculates a value of the difference between the average values A, A' of the two first outputs. The determination section 15 then refers to a data table shown in Table 1 below to determine the relative magnitude of the discharge.

TABLE 1

| A-A' | 0.9≤ | 0.8~0.2 | ≤0.1 |
|---|---|---|---|
| Magnitude of Discharge | Small | Medium | Large |

Figure 12:
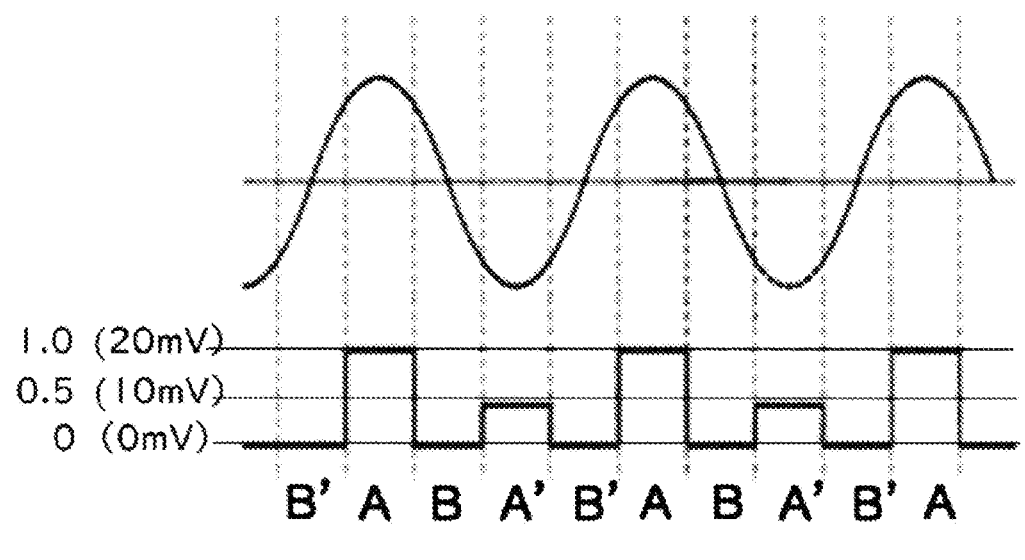
FIG. 12 is a waveform diagram illustrating the waveform of the alternating current power source and an output waveform of the smoothing section.

For example, the determination section 15 obtains the first outputs in the peak time domains A, A' of the cathode and the anode illustrated in FIG. 12 from the smoothing section 13. The average value A of the first outputs in the peak time domain A of the cathode is "1.0". Meanwhile, the average value A' of the first outputs in the peak time domain A' of the anode is "0.5". The difference value of the average values A, A' of the two first outputs is "0.5". The value of the difference between the average values A, A' is compared with the data table in Table 1 above. As a result, the determination section 15 determines that the relative magnitude of the discharge is "medium".

Figure 13:
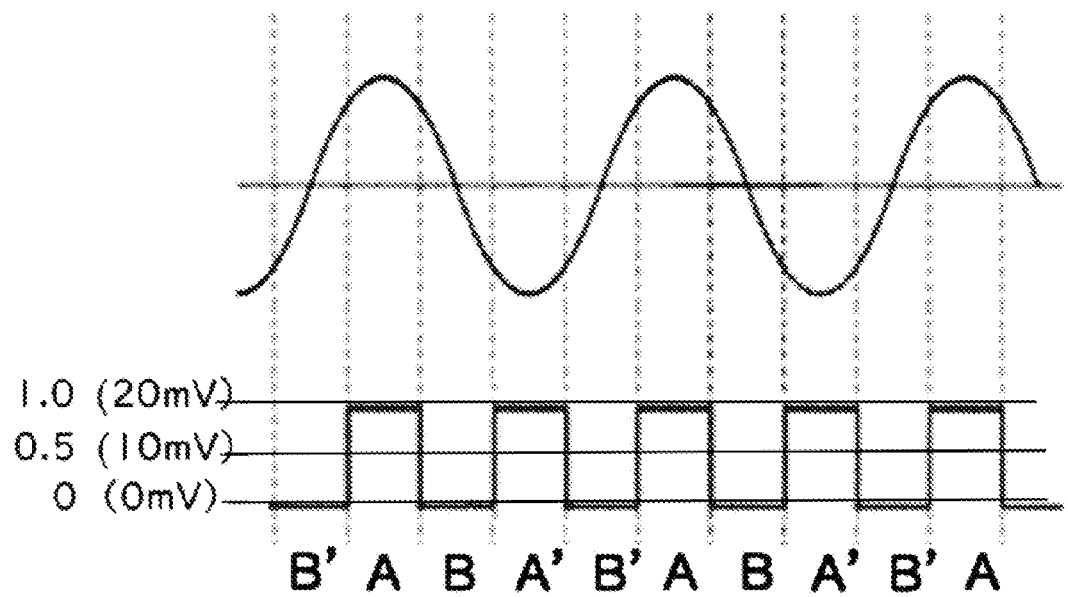
FIG. 13 is a waveform diagram illustrating the waveform of the alternating current power source and an output waveform of the smoothing section.

As another example, the determination section 15 obtains the first outputs in the peak time domains A, A' of the cathode and the anode illustrated in FIG. 13 from the smoothing section 13. The average value A of the first outputs in the peak time domain A of the cathode is "1.0". Meanwhile, the average value A' of the first outputs in the peak time domain A' of the anode is "1.0". The difference value between the average values A, A' of the two first outputs is "0". The determination section 15 compares the difference value between the average values A, A' with the data table in Table 1 above. As a result, the determination section 15 determines that the relative magnitude of the discharge is "large".

The results of the determination of the determination section 15 are visually or auditorily presented to a user via a reporting mechanism provided in the discharge detector 1. The user understands the relative magnitude of the discharge based on the results of the determination indicated by the reporting mechanism of the discharge detector 1. The user is thus allowed to perform in accordance with the relative magnitude of the discharge.

It should be noted that the data table shown in Table 1 above replaces the difference value between the average values A, A' of the two first outputs with any magnitude of "small", "medium", and "large". Meanwhile, a smaller difference value between the average values A, A' of the two first outputs indicates a closer distance from the discharge detector 1 to the location of the discharge occurrence. In addition, a larger difference value between the average values A, A' of the two first outputs indicates a further distance from the discharge detector 1 to the location of the discharge occurrence. Accordingly, the determination section 15 is capable of determining the relative distance from the discharge detector 1 to the location of the discharge occurrence by creating a data table that associates each difference value between the average values A, A' of the two first outputs with the relative distance to the location of the discharge occurrence and causing the determination section 15 to refer to the data table.

6.2 Determination Based on Difference Value C in Cathode and Difference Value C' in Anode The difference value between the first output of the smoothing section 13 in the peak time domain A and the second output of the smoothing section 13 in the zero cross time domain B of the cathode is defined as C. The difference value between the first output of the smoothing section 13 in the peak time domain A' and the second output of the smoothing section 13 in the zero cross time domain B' of the anode is defined as C'. The determination section 15 is capable of determining the relative distance to the location of the discharge occurrence and the relative magnitude of the discharge based on the difference value C in the cathode and the difference value C' in the anode.

For example, the determination section 15 calculates the difference value C in the cathode and the difference value C' in the anode for each cycle of the alternating current power source 91 while a predetermined time passes. The determination section 15 then calculates a sum value $C_{01}+C_{03}+\ldots C_{0X}$ of the difference values C in the cathode. The determination section 15 also calculates a sum value $C_{02}+C_{04}+\ldots C_{0X+1}$ of the difference values C' in the anode. The determination section 15 then determines the relative magnitude of the discharge referring to a data table shown in Table 2 below.

TABLE 2

| C-C' | ≤35 | 36~49 | 50≤ |
|---|---|---|---|
| Magnitude of Discharge | Large | Medium | Small |

Figure 14:
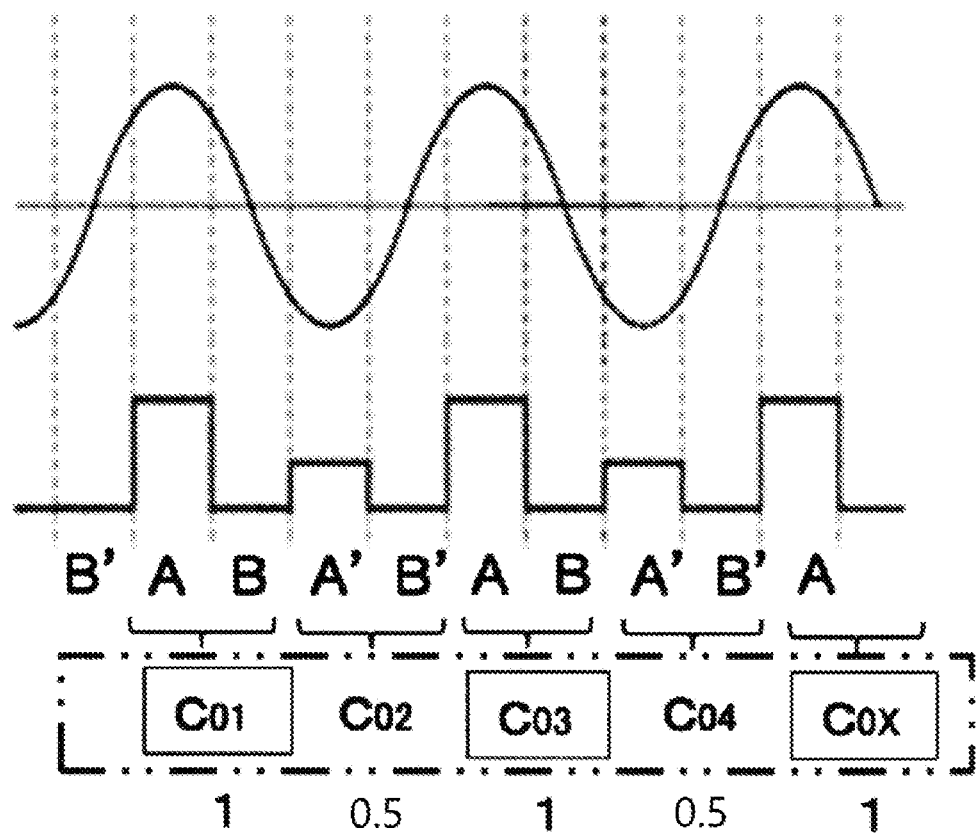
FIG. 14 is a waveform diagram illustrating the waveform of the alternating current power source and the output waveform of the smoothing section.

For example, the determination section 15 obtains outputs illustrated in FIG. 14 from the smoothing section 13 in the peak time domain A and the zero cross time domain B of the cathode and the peak time domain A' and the zero cross time domain B' of the anode.

The determination section 15 then calculates an average value A of the first outputs in the peak time domain A and an average value B of the second outputs in the zero cross time domain of the cathode and an average value A' of the first outputs in the peak time domain A' and an average value B' of the second outputs in the zero cross time domain B' of the anode for each cycle of the alternating current power source 91.

The determination section 15 then calculates values $C_{01}$, $C_{03}$, ..., $C_{0X}$ of the difference between the average values A and the average values B for each half cycle of the alternating current power source 91. In the outputs illustrated in FIG. 14, all the difference values $C_{01}$, $C_{03}$, ..., $C_{0X}$ are "1". Similarly, the determination section 15 calculates values $C_{02}$, $C_{04}$, ..., $C_{0X+1}$ of the difference between the average value A' and the average value B' for each half cycle of the alternating current power source 91. In the outputs illustrated in FIG. 14, all the difference values $C_{02}$, $C_{04}$, ..., $C_{0X+1}$ are "0.5".

The determination section 15 then calculates a sum value C of the difference values $C_{01}$, $C_{02}$, ..., $C_{0X}$. In the outputs illustrated in FIG. 14, the sum value C is "76". Similarly, the determination section 15 calculates a sum value C' of the difference values $C_{02}$, $C_{04}$, ..., $C_{0X+1}$. In the outputs illustrated in FIG. 14, the sum value C' is "38". The determination section 15 then calculates the difference value between the sum value C and the sum value C'. In the outputs illustrated in FIG. 14, the difference value between the sum value C and the sum value C' is "38". The determination section 15 compares the difference value between the sum values C, C' with the data table in Table 2 above. As a result, the determination section 15 determines that the relative magnitude of the discharge is "medium".

Figure 15:
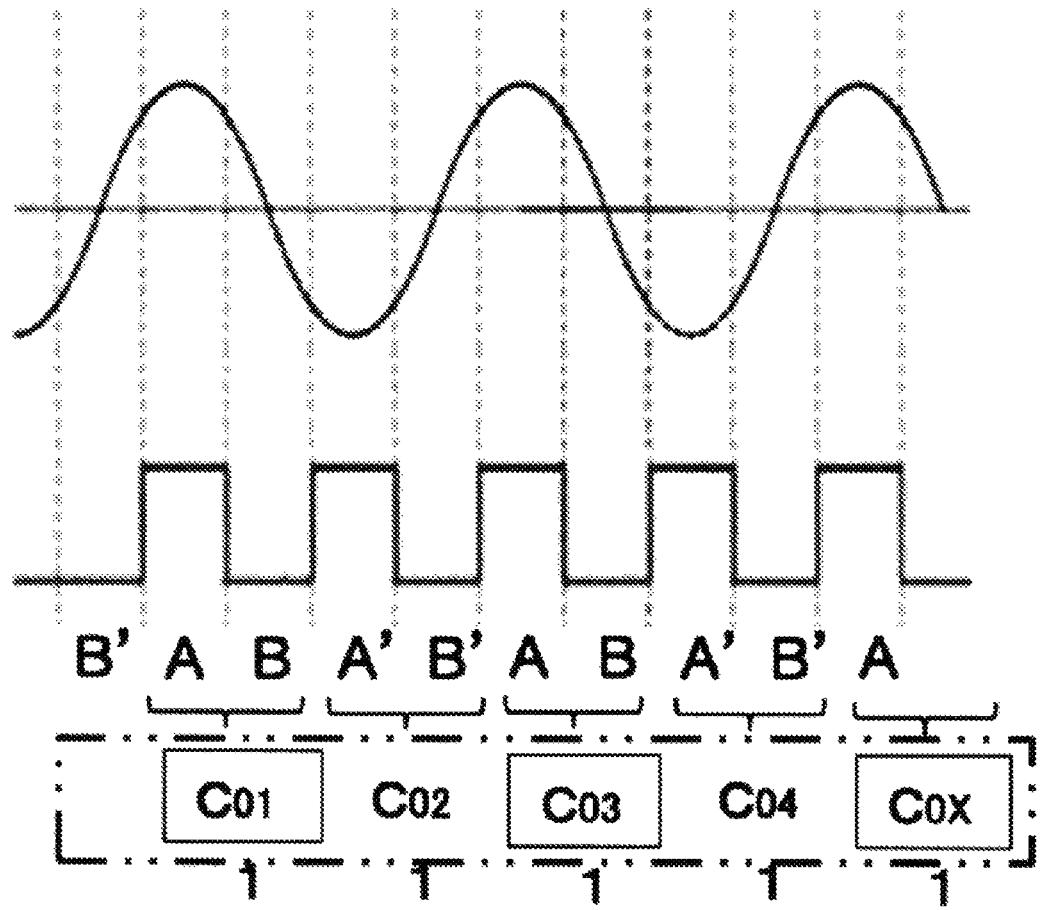
FIG. 15 is a waveform diagram illustrating the waveform of the alternating current power source and the output waveform of the smoothing section.

As another example, the determination section 15 obtains outputs illustrated in FIG. 15 from the smoothing section 13 in the peak time domain A and the zero cross time domain B of the cathode and the peak time domain A' and the zero cross time domain B' of the anode.

In the outputs illustrated in FIG. 15, all the difference values $C_{01}$, $C_{03}$, ..., $C_{0X}$ of the cathode are "1". Meanwhile, in the outputs illustrated in FIG. 15, all the difference values $C_{02}$, $C_{04}$, ..., $C_{0X+1}$ of the anode are also "1". Then, in the outputs illustrated in FIG. 15, the sum value C of the cathode is "76". Meanwhile, in the outputs illustrated in FIG. 15, the sum value C' of the anode is also "76". Accordingly, in the outputs illustrated in FIG. 15, the difference value between the sum value C and the sum value C' is "0". The determination section 15 compares the difference value between the sum values C, C' with the data table in Table 2 above. As a result, the determination section 15 determines that the relative magnitude of the discharge is "large".

It should be noted that the determination method in the present embodiment described above uses the sum value $C_{01}+C_{03}+ \ldots C_{0X}$ of the difference values C in the cathode and the sum value $C_{02}+C_{04}+ \ldots C_{0X+1}$ of the difference values C' in the anode, whereas the values to be used is not limited to them. For example, it is also possible to determine the relative magnitude of the discharge based on the difference value $C_{01}$ of the cathode and the difference value $C_{02}$ of the anode included in one cycle of the alternating current power source 91.

6.3 Determination Based on Number of Calculating Difference Values C, C' of Threshold or More In the determination method in the present embodiment described above, the determination section 15 is capable of determining the relative distance to the location of the discharge occurrence and the relative magnitude of the discharge based on the number of calculating the difference values C, C' of the threshold or more.

Figure 16:
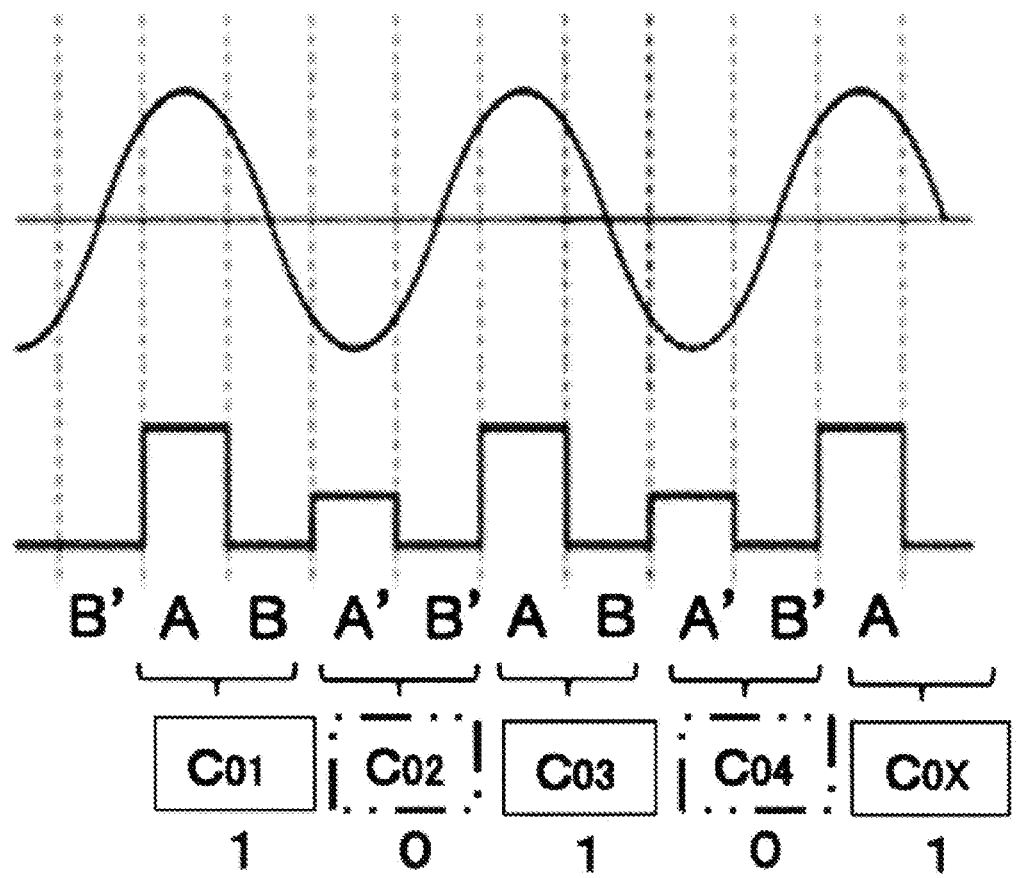
FIG. 16 is a waveform diagram illustrating the waveform of the alternating current power source and the waveform of the smoothing section.

For example, the determination section 15 obtains outputs illustrated in FIG. 16 from the smoothing section 13 in the peak time domain A and the zero cross time domain B of the cathode and the peak time domain A' and the zero cross time domain B' of the anode.

The determination section 15 calculates the difference values $C_{01}$, $C_{03}$, ..., $C_{0X}$ in the cathode and the difference values $C_{02}$, $C_{04}$, ..., $C_{0X+1}$ in the anode for each cycle of the alternating current power source 91 while a predetermined time passes. The determination section 15 compares all the difference values $C_{01}$, $C_{02}$, $C_{03}$, $C_{04}$, ..., $C_{0X}$ calculated within the predetermined time with a threshold set in advance. The determination section 15 then counts the number of calculating the difference values of the threshold or more. For example, in the outputs illustrated in FIG. 16, each of the difference values $C_{01}$, $C_{03}$, ... $C_{0X}$ of the threshold or more is counted as "1". Meanwhile, each of the difference values $C_{02}$, $C_{04}$, ..., $C_{0X+1}$ less than the threshold is counted as "0". As a result, the number of calculating the difference values of the threshold or more is "6". The determination section 15 then compares the number "6" of calculating the difference values of the threshold or more with a data table illustrated in Table 3 below. As a result, the determination section 15 determines that the relative magnitude of the discharge is "medium".

TABLE 3

| Number of Calculation | ≤5 | 6~24 | 25≤ |
|---|---|---|---|
| Magnitude of Discharge | Small | Medium | Large |

Figure 17:
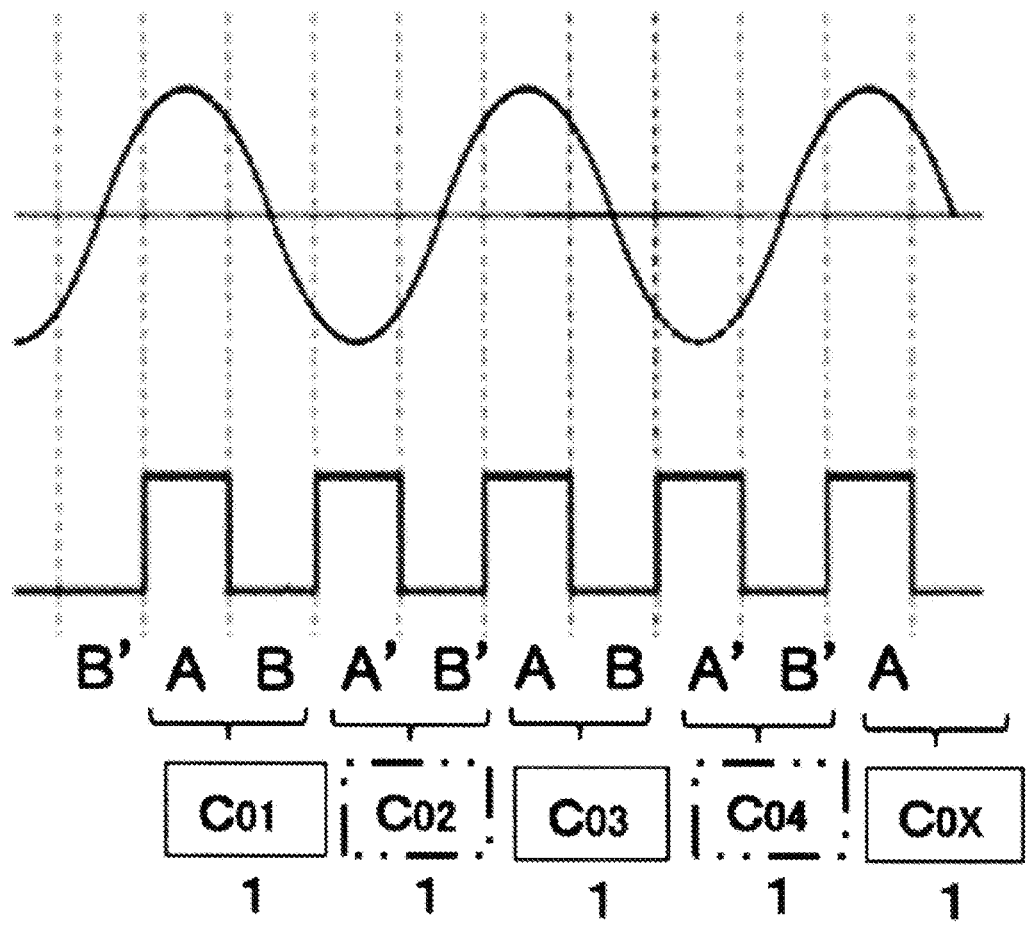
FIG. 17 is a waveform diagram illustrating the waveform of the alternating current power source and the output waveform of the smoothing section.

As another example, the determination section 15 obtains outputs illustrated in FIG. 17 from the smoothing section 13 in the peak time domain A and the zero cross time domain B of the cathode and the peak time domain A' and the zero cross time domain B' of the anode. In the outputs illustrated in FIG. 17, both values of the first outputs in the peak time domains A, A' of the cathode and the anode are more than a threshold set in advance.

In the outputs illustrated in FIG. 17, all the difference values $C_{01}$, $C_{02}$, $C_{03}$, $C_{04}$, ..., $C_{0X}$ calculated within a predetermined time are more than the threshold. Thus, all the difference values $C_{01}$, $C_{02}$, $C_{03}$, $C_{04}$, ..., $C_{0X}$ are counted as "1". As a result, the number of calculating the difference values of the threshold or more is "25". The determination section 15 then compares the number "25" of calculating the difference values of the threshold or more with the data table illustrated in Table 3 above. As a result, the determination section 15 determines that the relative magnitude of the discharge is "large".

7. Control of Amplification Factor of Amplifier

As described above, the determination section 15 of the discharge detector 1 determines whether discharge has occurred based on the difference between the first output of the smoothing section 13 in the peak time domains A, A' and the second output of the smoothing section 13 in the zero cross time domains B, B'. For example, the determination section 15 determines that discharge has occurred if the difference value between the first output and the second output is the first threshold or more. As another example, the determination section 15 compares the difference value of the first threshold or more with the second threshold, and if the difference value is the second threshold or more, outputs a signal to interrupt a breaker.

Meanwhile, some devices provided with a motor, such as an electric drill and an electric mixer, continuously generate a noise at the level more than the threshold during normal operation. The noise generated by normal operation of a load is superimposed on the entire alternating current power source 91 including the peaks. Thus, the noise generated by the load increases the second output of the smoothing section 13 in the zero cross time domains B, B'. Accordingly, if discharge occurs in the state where the noise of the load is superimposed on the entire alternating current power source 91, the difference value between the first outputs of the smoothing section 13 in the peak time domains A, A' and the second outputs of the smoothing section 13 in the zero cross time domains B, B' is sometimes smaller than the first threshold. In such a case, the determination section 15 is not capable of accurately determining whether discharge has occurred.

Figure 18:
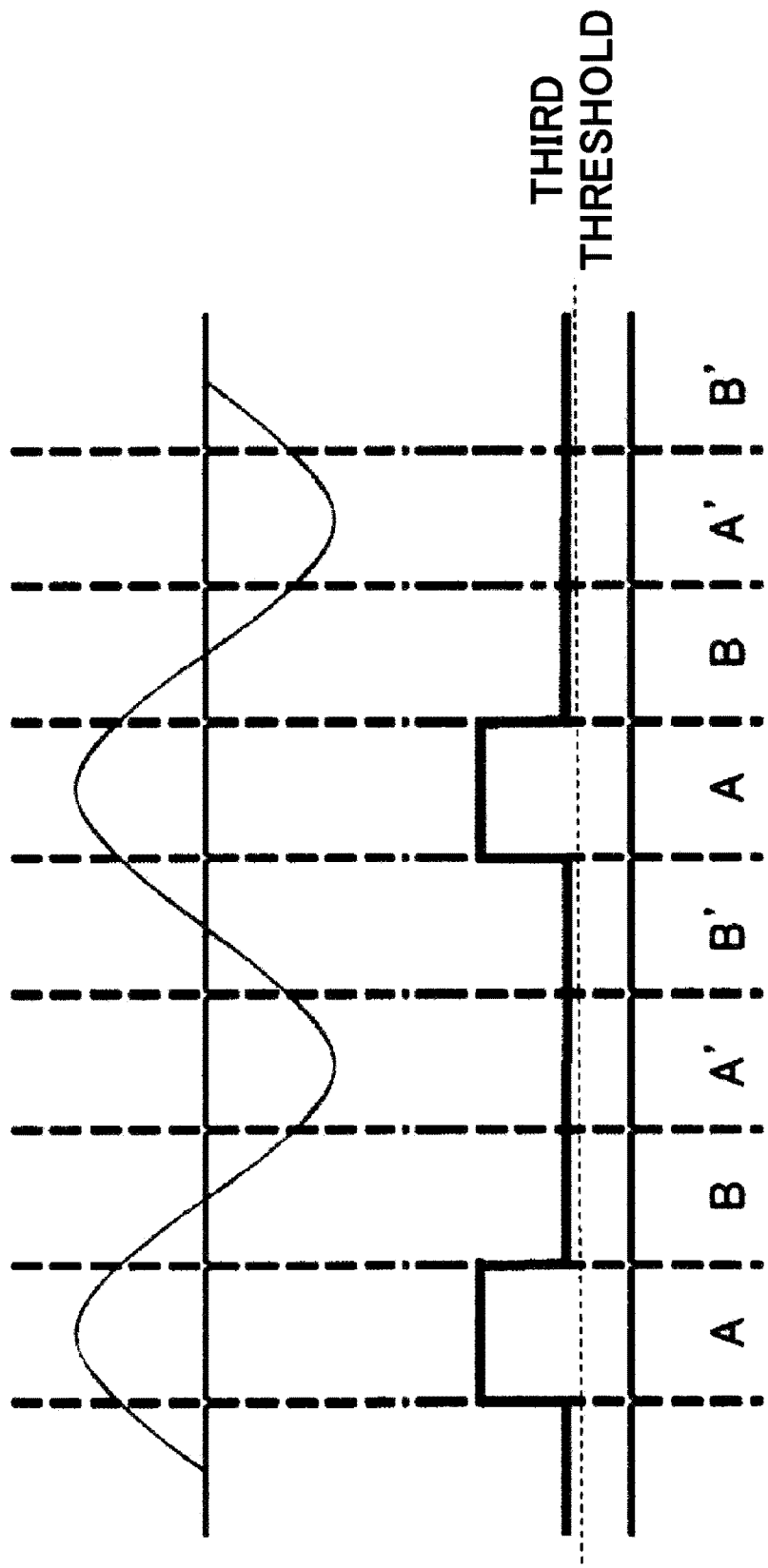
FIG. 18 is a waveform diagram illustrating the waveform of the alternating current power source and an output waveform of the smoothing section, where the output waveform of the smoothing section includes both the noise generated by discharge and the noise generated by normal operation of a load.
Figure 19:
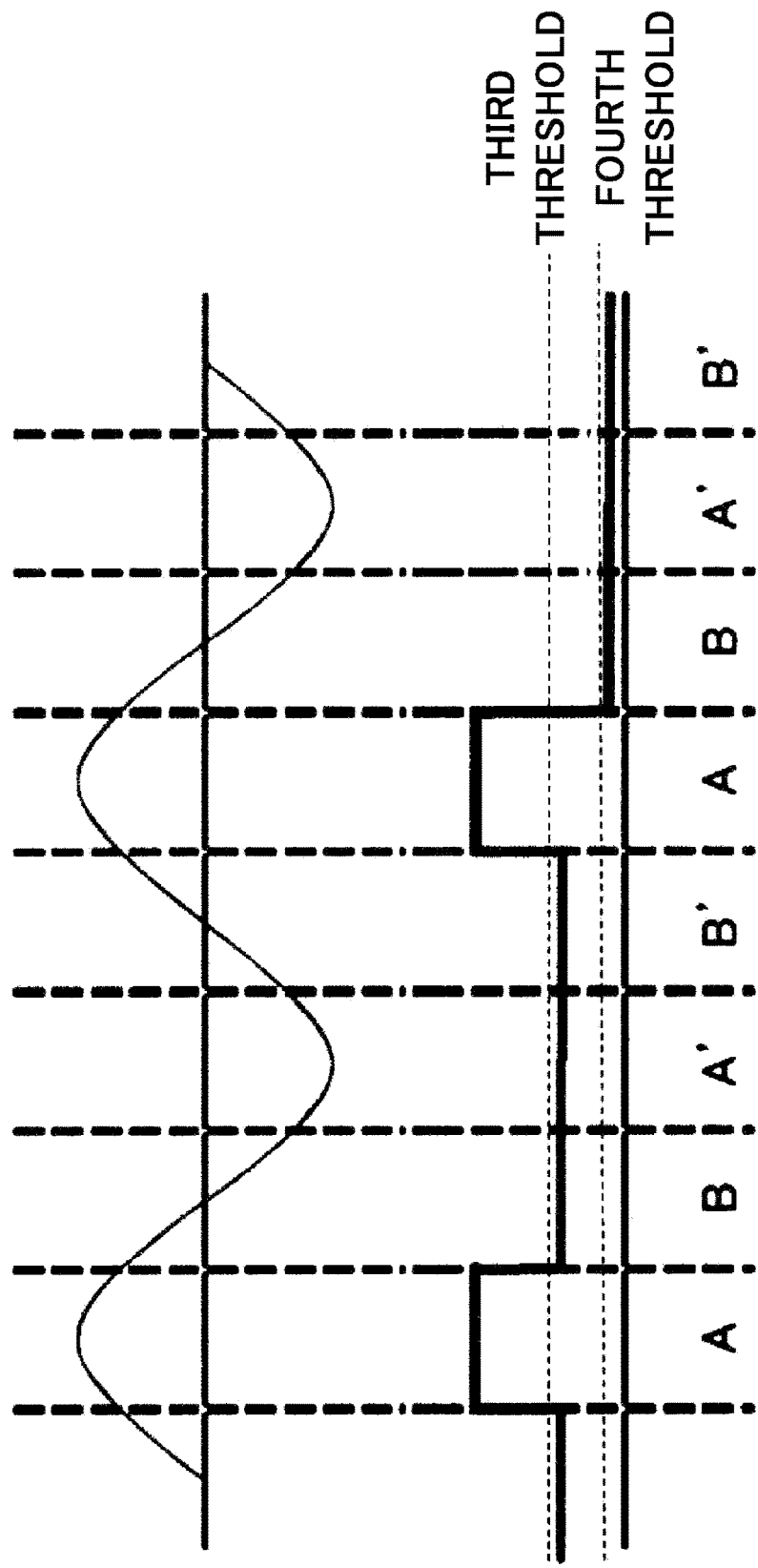
FIG. 19 is a waveform diagram illustrating the waveform of the alternating current power source and output waveforms of the smoothing section, where the output waveforms of a smoothing section include both the noise generated by discharge and the noise generated by normal operation of a load.

FIGS. 18 and 19 are waveforms diagram illustrating the waveform of the alternating current power source 91 and an output waveform of the smoothing section 13, where the output waveform of the smoothing section 13 includes both a noise generated by discharge and a noise generated by normal operation of a load. To the discharge detector 1 in the present embodiment, a third threshold and a fourth threshold are set to monitor the second outputs of the smoothing section 13 in the zero cross time domains B, B'.

As illustrated in FIG. 18, the determination section 15 obtains the second outputs of the smoothing section 13 in the zero cross time domains B, B' in time series based on the pulse output from the phase division section 14. The determination section 15 then compares the second outputs with the third threshold. If a value of the second output is the third threshold or more, the determination section 15 outputs a signal to the amplifier 12 to reduce the amplification factor of the amplifier 12. The determination section 15 reduces the amplification factor of the amplifier 12 stepwise until a value of the second output becomes less than the threshold. It should be noted that the determination section 15 preferably reports to a user that the determination of whether discharge has occurred cannot be executed while the values of the second outputs are the third threshold or more and less than the third threshold.

Then, when use of the load generating the noise is ended, the values of the second outputs become less than the third threshold as illustrated in FIG. 19. In this case, the determination section 15 compares the second outputs with the fourth threshold. The fourth threshold is a value smaller than the third threshold. If a value of the second output is less than the fourth threshold, the determination section 15 outputs a signal to the amplifier 12 to return the amplification factor of the amplifier 12 to the original value.

8. Process of Coping with Instantaneous Decrease in Noise Level

As described above, the determination section 15 calculates a difference value between the first output and the second output of the smoothing section 13 for each cycle of the alternating current power source 91. The determination section 15 then determines that discharge has occurred if the difference values of the threshold or more continue until a predetermined time passes set in advance.

Figure 28:
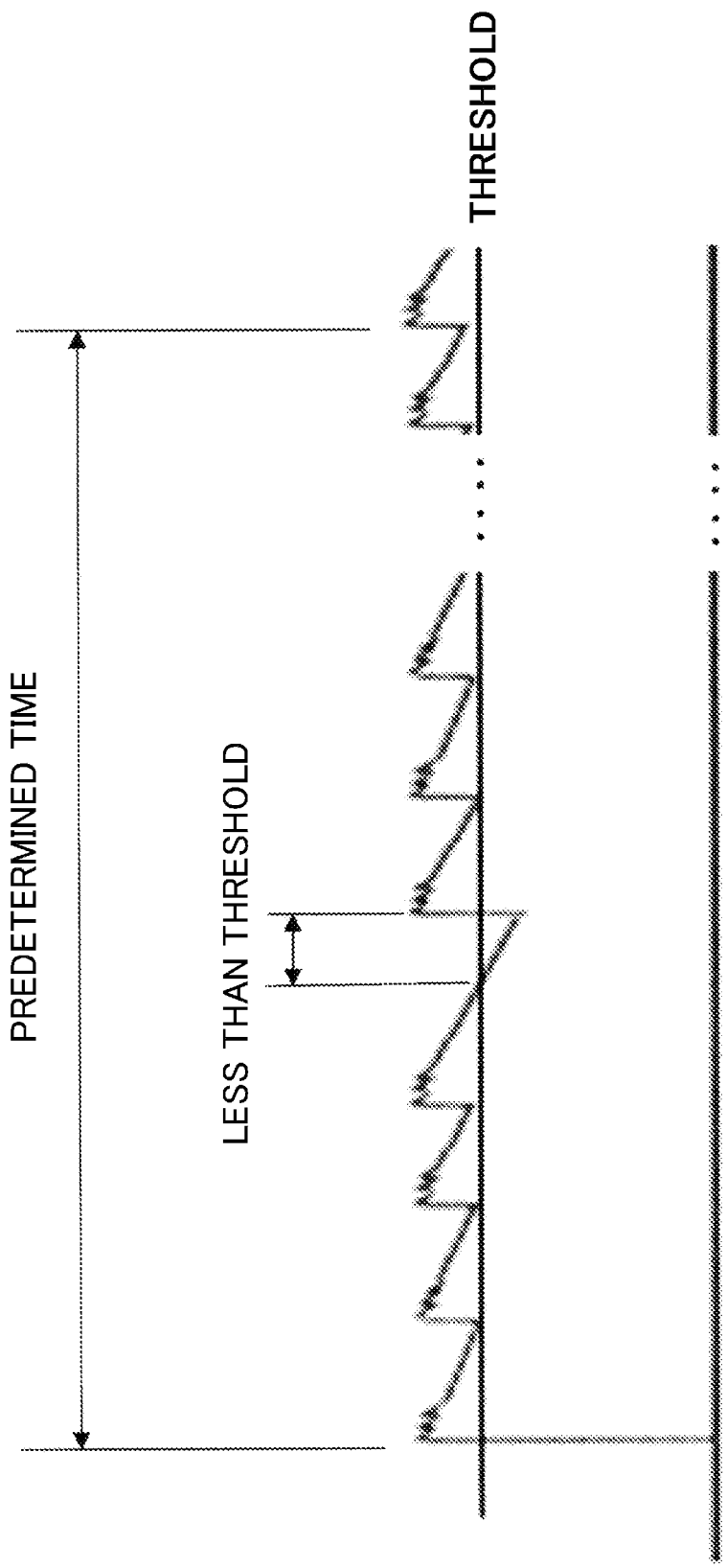
FIG. 28 is a waveform diagram illustrating a waveform of a noise generated by discharge.

However, as illustrated in the output waveform of the noise in FIG. 28, the level of a noise generated by discharge is sometimes instantaneously less than the threshold while the determination section 15 measures the predetermined time. In this case, the difference value between the first output and the second output of the smoothing section 13 is also less than the threshold. The determination section 15 thus determines that discharge has not occurred and resets the measurement of the predetermined time. Immediately after that, the noise level becomes the threshold or more again. Then, the determination section 15 starts measuring the predetermined time once again. In short, the determination section 15 determines that discharge has not occurred every time the noise level instantaneously decreases and redoes the measurement of the predetermined time. The determination section 15 thus used to have a problem of not capable of detecting intermittent discharge causing the noise level to instantaneously decrease. Upon this, the discharge detector 1 in the present embodiment employs process described below to eliminate omissions of discharge detection caused by the instantaneous decrease in the noise level.

8.1 Measurement of Time when Noise Level Decreases

Figure 20:
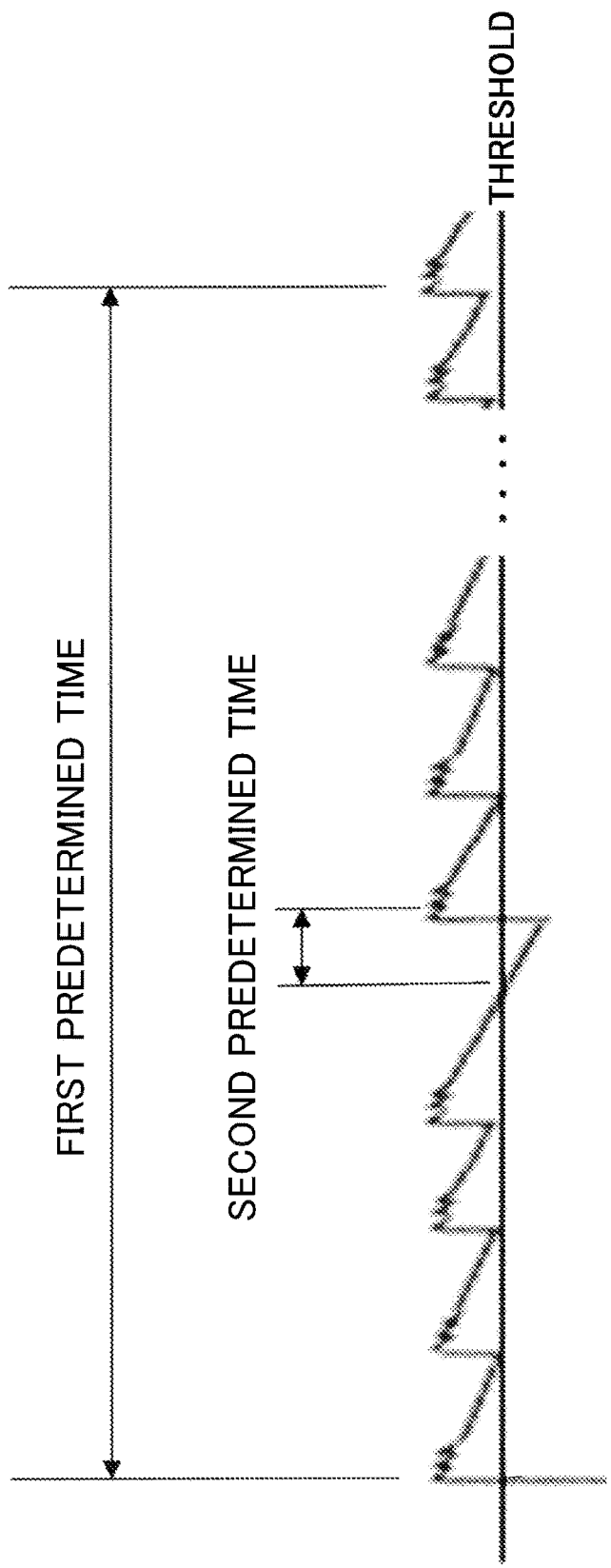
FIG. 20 is a waveform diagram illustrating an output waveform of a noise generated by discharge, the noise with an instantaneously decreasing level.

FIG. 20 illustrates an output waveform of a noise generated by discharge, the noise with an instantaneously decreasing level. In FIG. 20, in a timing when the noise level is the threshold or more, the determination section 15 starts measurement of a first predetermined time. While the first predetermined time passes, the determination section 15 executes the arithmetic process described above to determine whether discharge has occurred. Then, if the noise level of the threshold or more continues until the first predetermined time passes, the determination section 15 determines that discharge has occurred.

In contrast, if the noise level decreases to less than the threshold while the first predetermined time passes, the determination section 15 continues the measurement of the first predetermined time and also starts measurement of a second predetermined time. The second predetermined time is the time while the level of the noise generated by discharge is less than the threshold and is a short time allowing acknowledgement of the discharge continuity. The second predetermined time may be set to, for example, the time equivalent to one to three cycles of the alternating current power source 91.

If the noise level is the threshold or more while the second predetermined time passes, the determination section 15 resets the measurement of the second predetermined time. Then, if the noise level of the threshold or more continues until the first predetermined time passes, the determination section 15 determines that discharge has occurred.

In contrast, if the noise level is not the threshold or more until the second predetermined time passes, the determination section 15 resets the measurement of the first predetermined time and also terminates the arithmetic process for determining whether discharge has occurred.

Figure 21:
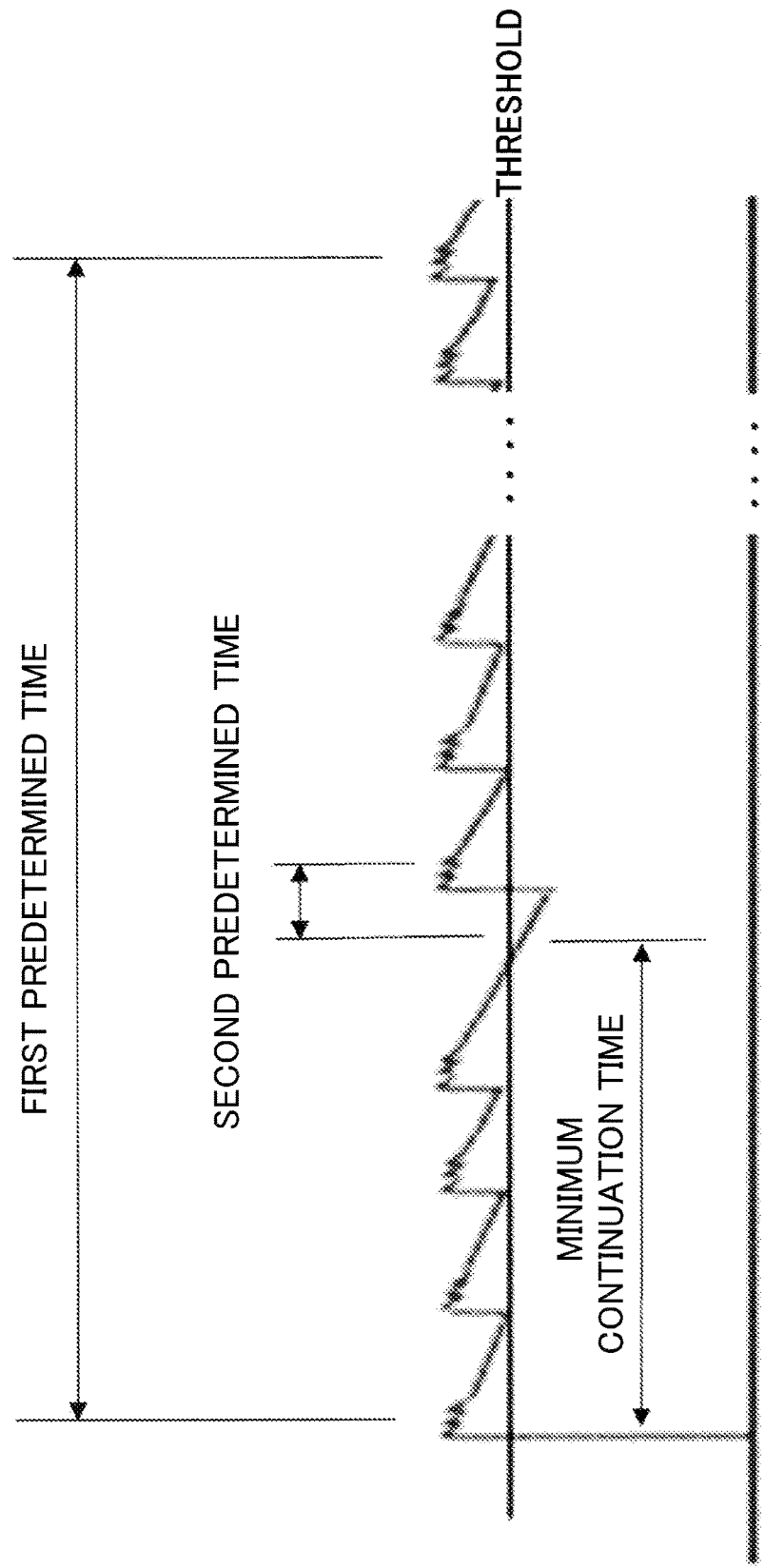
FIG. 21 is a waveform diagram illustrating an output waveform of a noise generated by discharge, the noise with an instantaneously decreasing level.

It is allowed to set a condition for executing the measurement of the second predetermined time. For example, a minimum continuation time as illustrated in FIG. 21 is set. The minimum continuation time is the minimum time considered that a noise level of the threshold or more is continuously generated. The minimum continuation time is an indicator for whether a noise level of the threshold or more continues. If a noise level of the threshold or more is continuously generated while the minimum continuation time passes, the determination section 15 executes measurement of the second predetermined time. Setting of such a minimum continuation time eliminates repeating of measurement of the second predetermined time every time a noise at a level of the threshold or more is instantaneously generated.

Respective initial values of the first predetermined time, the second predetermined time, and the minimum continuation time illustrated in FIG. 21 are set to the discharge detector 1 in advance. The discharge detector 1 is preferably provided with a user interface, not shown, to change the respective initial values of the first predetermined time, the second predetermined time, and the minimum continuation time. The user interface is provided with, for example, a display section and a button. The display section displays respective set values of the first predetermined time, the second predetermined time, and the minimum continuation time. Operation of the button causes a change in the respective set values of the first predetermined time, the second predetermined time, and the minimum continuation time. As another example, the user interface of the discharge detector 1 may be configured with a program installed in a terminal device, such as a personal computer, a tablet computer, and a smartphone, owned by a user. The terminal device performs wired or wireless communication with the discharge detector 1. Operation of the terminal device causes a change in the respective set values of the first predetermined time, the second predetermined time, and the minimum continuation time.

8.2 Specific Example 1 of Process of Determination Section

Figure 22:
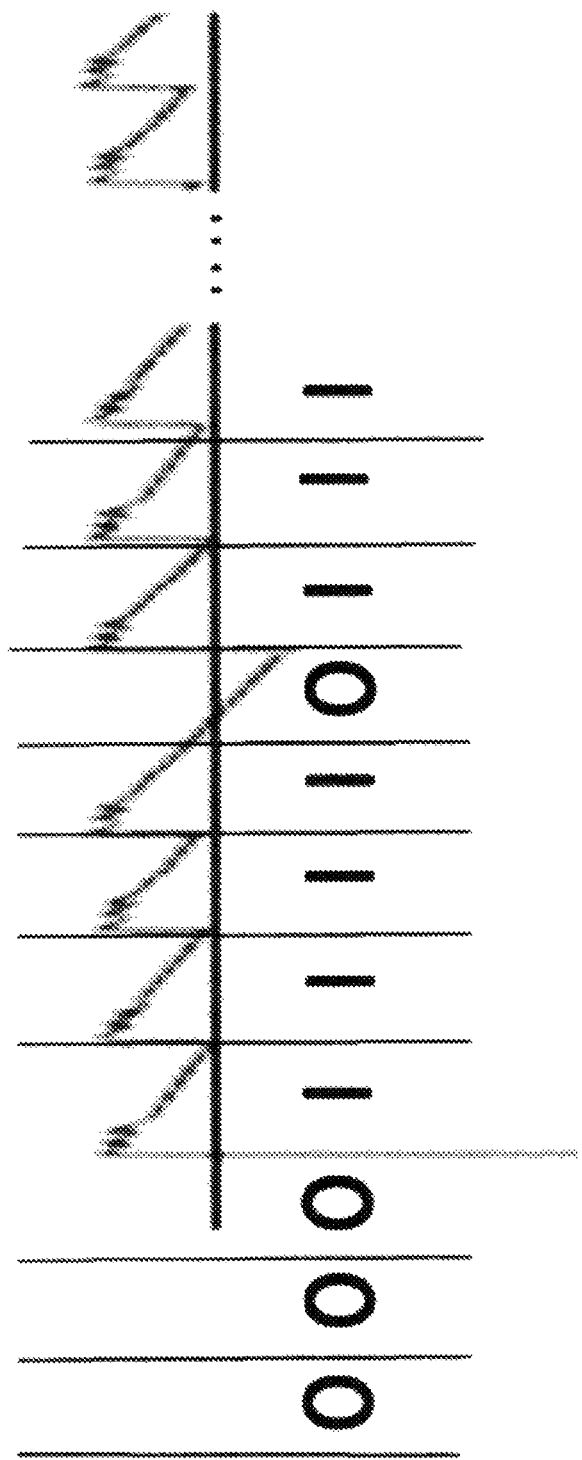
FIG. 22 is a schematic diagram illustrating results of determination of whether the noise level is the threshold or more by the determination section.

For example, as illustrated in FIG. 22, the determination section 15 determines whether a noise at a level of the threshold or more has detected for each cycle of the alternating current power source 91. If a noise at a level of the threshold or more has detected, the determination section 15 stores "1". In contrast, if a noise at a level of the threshold or more has not detected, the determination section 15 stores "0". The illustration of "11110111" in FIG. 22 indicates that a noise at a level of the threshold or more has been continuously detected from the first to fourth cycles of the alternating current power source 91, that the level of the noise decreased to less than the threshold in the fifth cycle, and that the noise at a level of the threshold or more has been continuously detected from the sixth to eighth cycles. In such a manner, the determination section 15 stores whether a noise at a level of the threshold or more has detected using "1" or "0" for each cycle of the alternating current power source 91.

Figure 23:
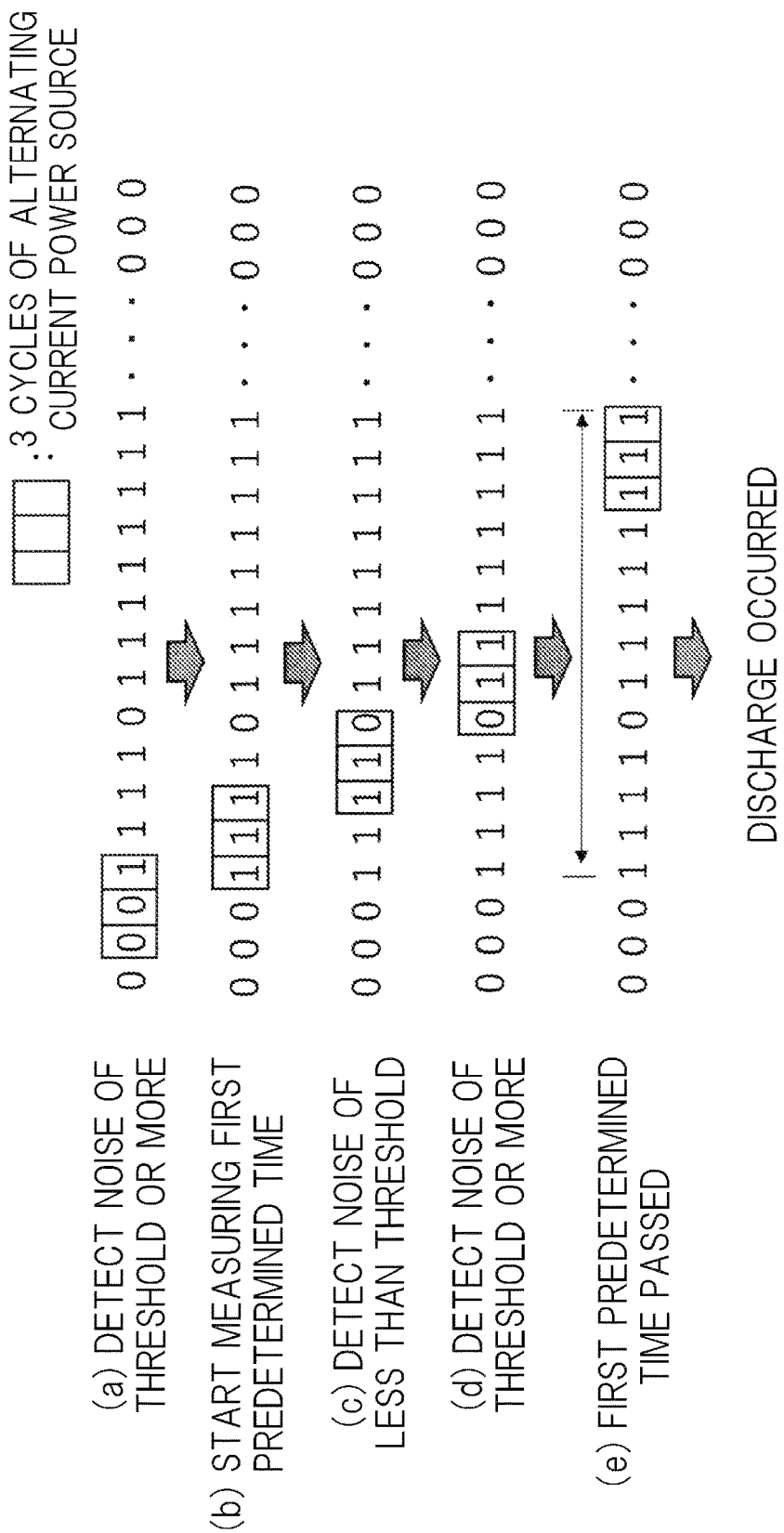
FIG. 23 is a schematic diagram illustrating a process of determining whether discharge has occurred by the determination section.

FIG. 23 illustrates a process of determining whether discharge has occurred by the determination section 15. In FIG. 23, the determination section 15 executes process related to determination based on results of detection corresponding to three cycles of the alternating current power source 91. For example, the determination section 15 executes the process related to determination if a noise at a level of the threshold or more has been continuously detected in three cycles ("111") or if a noise at a level of the threshold or more has not been continuously detected in three cycles ("000").

The illustration "001" in FIG. 23(a) indicates the timing of detecting the noise at a level of the threshold or more for the first time by the determination section 15. In this situation, the determination section 15 does not execute any process at all. In short, the determination section 15 does not start measurement of the first predetermined time by detecting the noise at a level of the threshold or more only once.

Then, "111" in FIG. 23(b) indicates the timing of continuously detecting a noise at a level of the threshold or more in three cycles by the determination section 15. In this situation, the determination section 15 starts measurement of the first predetermined time.

Then, "110" in FIG. 23(c) indicates the timing of detecting a noise at a level less than the threshold by the determination section 15. In this situation, the determination section 15 does not execute any process at all. In short, the determination section 15 does not terminate the measurement of the first predetermined time by detecting a noise at a level less than the threshold only once. The determination section 15 does not reset the measurement of the first predetermined time unless a noise "000" at a level less than the threshold is continuously detected in three cycles.

Then, "011" in FIG. 23(d) indicates the timing when the noise level becomes the threshold or more again from less than the threshold. The determination section 15 continues the measurement of the first predetermined time. Then, "111" in FIG. 23(e) indicates the timing when the first predetermined time has passed. As illustrated by the arrows in FIG. 23(e), a noise at a level of the threshold or more has been continuously detected while the first predetermined time has passed. As a result, the determination section 15 determines that discharge has occurred.

8.3 Specific Example 2 of Process of Determination Section

Figure 24:
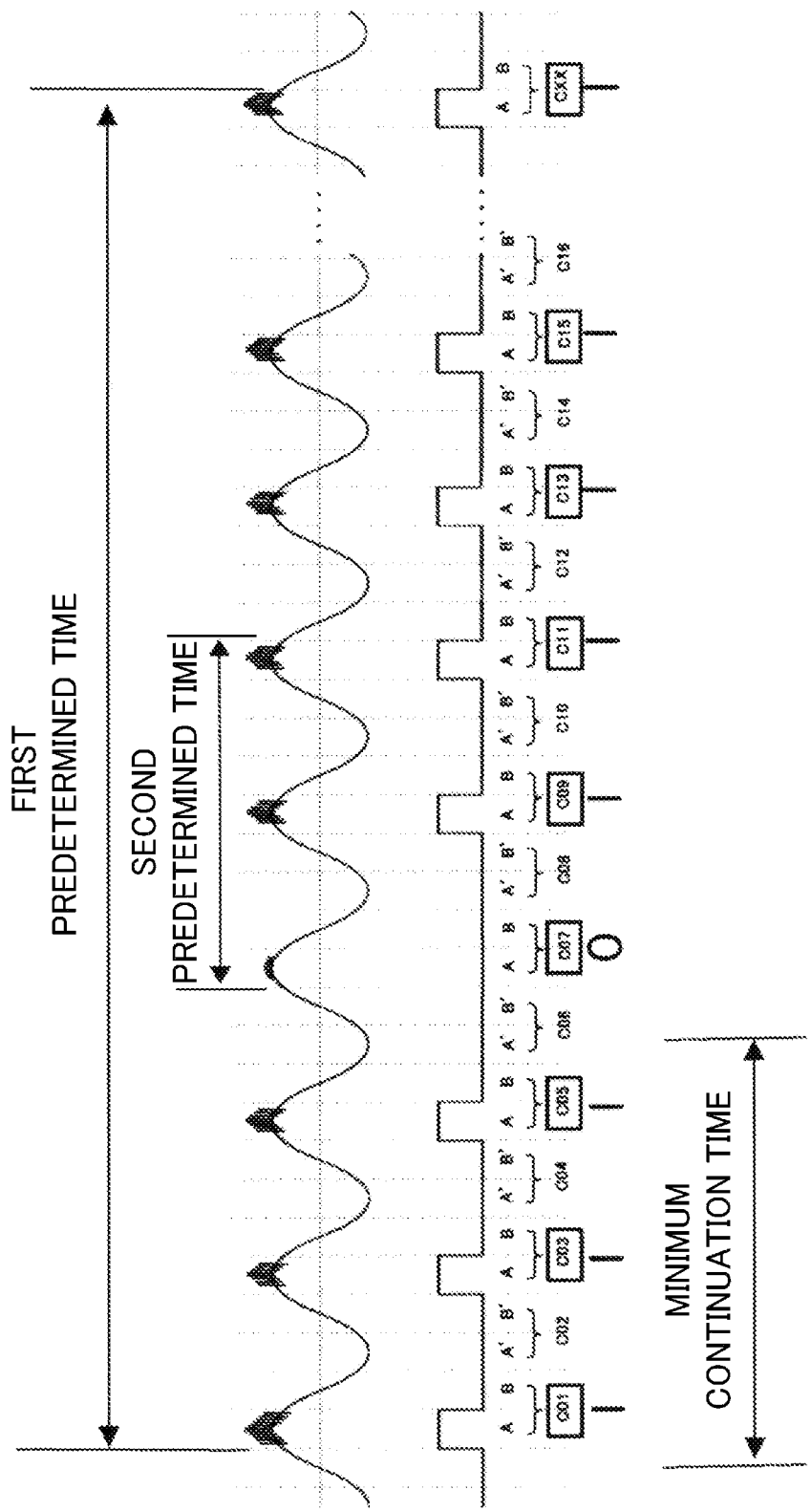
FIG. 24 is a waveform diagram illustrating the waveform of the alternating current power source and an output waveform of the smoothing section.
Figure 25:
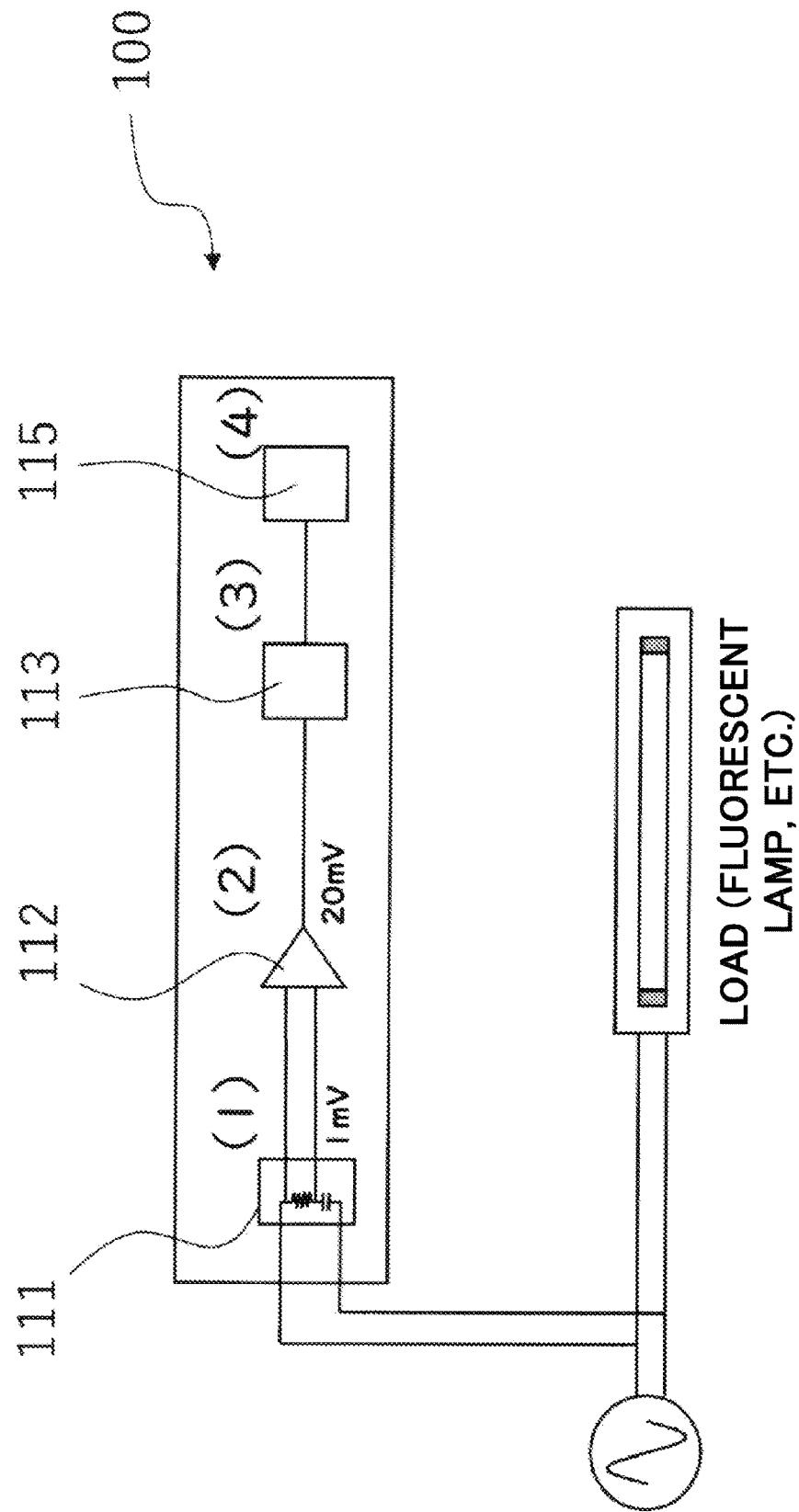
FIG. 25 is a schematic diagram illustrating a discharge detector in the past.
Figure 26:
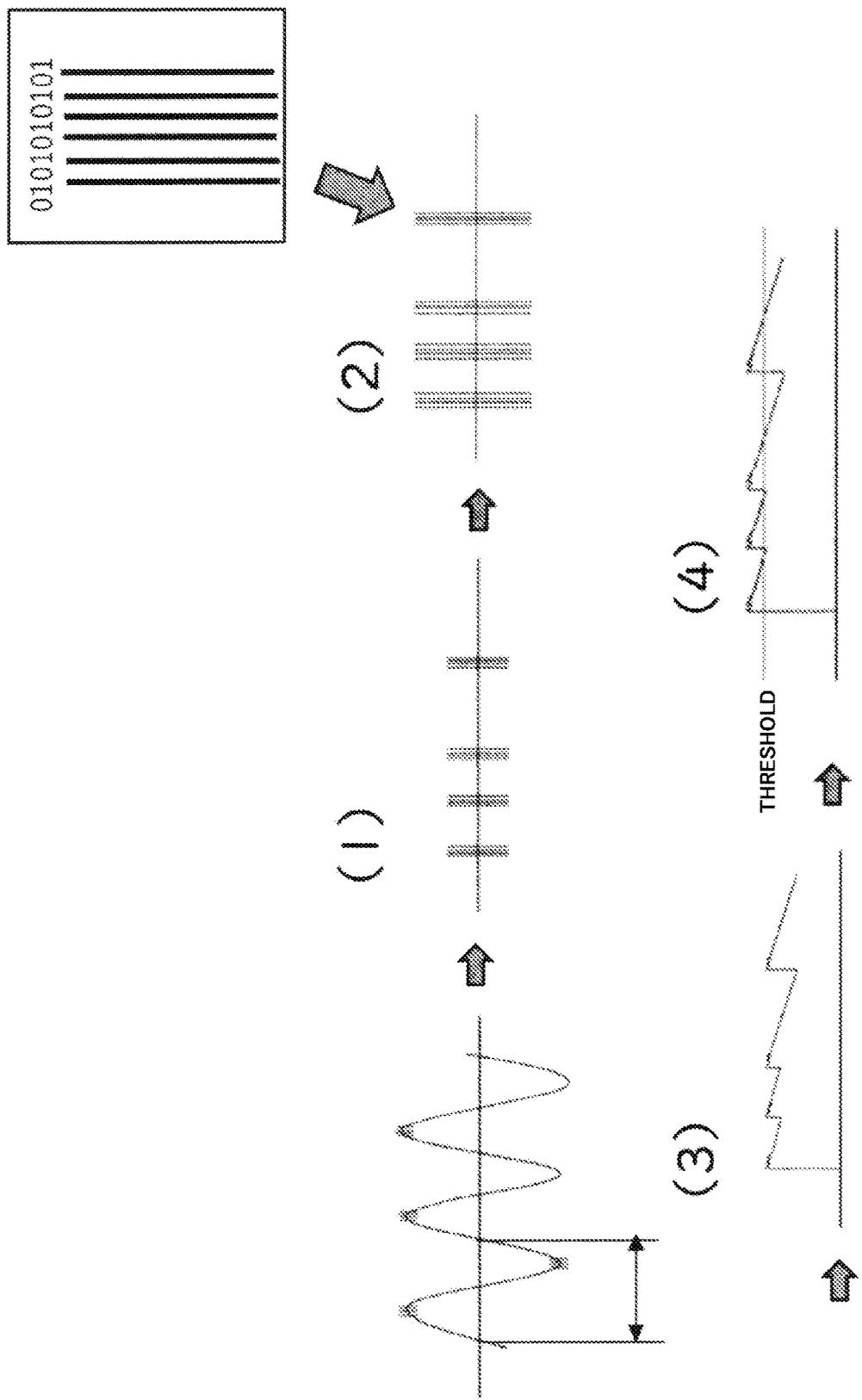
FIG. 26 is a waveform diagram illustrating the waveform of the alternating current power source, a waveform of a noise extracted from the alternating current power source, a waveform of an amplified noise, and a waveform of a smoothed noise.

FIG. 24 illustrates the waveform of the alternating current power source 91 and an output waveform of the smoothing section 13. As illustrated in FIG. 24, the determination section 15 is capable of executing process of coping with an instantaneous decrease in the noise level based on the first output of the smoothing section 13 in the peak time domains A, A' and the second outputs of the smoothing section 13 in the zero cross time domains B, B'.

For example, the determination section 15 calculates the difference values $C_{01}$, $C_{03}$, $C_{05}$, $C_{07}$, $C_{09}$, $C_{11}$, $C_{13}$, $C_{15}$, . . . , $C_{XX}$ between the first output of the smoothing section 13 in the peak time domain A and the second output of the smoothing section 13 in the zero cross time domain B of the cathode for each cycle of the alternating current power source 91. The determination section 15 starts measuring the first predetermined time and the minimum continuation time in the timing of calculating the difference value $C_{01}$ of the threshold or more. The determination section 15 then terminates the measurement of the minimum continuation time in the timing of continuously detecting the difference values $C_{01}$, $C_{03}$, $C_{05}$ of the threshold or more in three cycles.

The determination section 15 then starts measurement of the second predetermined time in the timing of calculating the difference value $C_{07}$ of less than the threshold. The second predetermined time is equivalent to, for example, three cycles of the alternating current power source 91. In this situation, the determination section 15 does not terminate the measurement of the first predetermined time. The determination section 15 does not reset the measurement of the first predetermined time unless a noise "000" at a level less than the threshold is continuously detected in three cycles.

The determination section 15 then terminates the measurement of the second predetermined time in the timing of calculating the difference value $C_{09}$ of the threshold or more. The determination section 15 subsequently calculates the difference values $C_{11}$, $C_{13}$, $C_{15}$, . . . , $C_{XX}$ of the threshold or more while the first predetermined time passes. As a result, the determination section 15 determines that discharge has occurred.

DESCRIPTION OF REFERENCE NUMERALS

1 Discharge Detector
8 Load
11 High Pass Filter
12 Amplifier
13 Smoothing Section
14 Phase Division Section
15 Determination Section
91 Alternating Current Power Source

The invention claimed is:

1. A discharge detector for detecting discharge occurred in a circuit with an electrically connected load based on a noise in a high frequency band superimposed on an alternating current power source supplied to the circuit, the discharge detector comprising:
    a high pass filter configured to extract a frequency component in the high frequency band from the alternating current power source;
    an amplifier configured to amplify an output of the high pass filter;
    a smoothing section configured to smooth an output of the amplifier;
    a phase division section configured to specify a peak time domain including time before and after a peak value and a zero cross time domain including time before and after a 0 value based on a value in one cycle of a voltage or current of the alternating current power source; and
    a determination section configured to determine whether discharge has occurred based on a difference between a first output of the smoothing section in the peak time domain and a second output of the smoothing section in the zero cross time domain.

2. The discharge detector according to claim 1, wherein the determination section executes:
    process of repeatedly calculating the difference between the first output and the second output corresponding to a plurality of continuous cycles of the voltage or current of the alternating current power source;
    process of comparing each value of the repeatedly calculated differences with a threshold; and
    process of determining that discharge has occurred if the difference values of the threshold or more continue.

3. The discharge detector according to claim 2, further comprising a plurality of the high pass filters electrically connected to a plurality of the circuits, respectively, wherein
    each of the plurality of the high pass filters extracts the frequency component in the high frequency band from the alternating current power source supplied to the respective circuits;
    the determination section executes:
    process of repeatedly calculating the difference between the first output and the second output corresponding to each of the high pass filters;
    process of calculating a sum or average value of the repeatedly calculated difference values corresponding to each of the high pass filters; and
    process of specifying the circuit in which the discharge has occurred by comparing the sum or average values corresponding to the respective high pass filters.

4. The discharge detector according to claim 1, wherein the phase division section is configured to be capable of adjusting lengths of the peak time domain and the zero cross time domain.

5. The discharge detector according to claim 1, wherein the phase division section is capable of specifying two of the peak time domains and two of the zero cross time domains corresponding to approximate one cycle of the voltage or current of the alternating current power source by outputting and/or not outputting a pulse in a timing of beginning and/or end of the peak time domain and/or the zero cross time domain.

6. The discharge detector according to claim 1, wherein the determination section executes:
    process of comparing a value of the difference between the first output and the second output with a first threshold;
    process of comparing the difference value with a second threshold if the difference value is the first threshold or more; and
    process of determining that discharge has occurred if the difference value is the second threshold or more.

7. The discharge detector according to claim 1, wherein the determination section determines a relative distance to a location of discharge occurrence and/or relative magnitude of the discharge based on the first output in the peak time domain of a cathode and the first output in the peak time domain of an anode included in at least one cycle of the voltage or current of the alternating current power source.

8. The discharge detector according to claim 7, wherein the determination section determines the relative distance to the location of discharge occurrence and/or the relative magnitude of the discharge based on:
    a difference between the first output in the peak time domain of the cathode and the second output in the zero cross time domain of the cathode immediately before or immediately after the peak time domain; and
    a difference between the first output in the peak time domain of the anode and the second output in the zero cross time domain of the anode immediately before or immediately after the peak time domain.

9. The discharge detector according to claim 1, wherein the determination section executes:
    process of comparing the second output with a third threshold; and
    process of reporting that the determination of whether discharge has occurred cannot be executed if the second output is the third threshold or more.

10. The discharge detector according to claim 1, wherein the determination section executes:
    process of comparing the second output with a third threshold; and
    process of reducing an amplification factor of the amplifier if the second output is the third threshold or more.

11. The discharge detector according to claim 1, wherein the determination section executes:
    process of repeatedly calculating the difference between the first output and the second output based on values in a plurality of continuous cycles of the voltage or current of the alternating current power source;
    process of comparing each value of the repeatedly calculated differences with a threshold;
    process of starting measurement of a first predetermined time if the difference value is the threshold or more;
    process of determining that discharge has occurred if the difference values of the threshold or more continue while the first predetermined time passes;

process of starting measurement of a second predetermined time shorter than the first predetermined time if the difference value is less than the threshold while the first predetermined time passes;

process of terminating the measurement of the first predetermined time midway if the difference value is not the threshold or more while the second predetermined time passes; and process of determining that discharge has occurred if the difference value is the threshold or more while the second predetermined time passes and the difference values of the threshold or more continue until the first predetermined time passes.

12. The discharge detector according to claim 1, wherein the determination section executes:

process of repeatedly calculating the difference between the first output and the second output based on values in a plurality of continuous cycles of the voltage or current of the alternating current power source;

process of comparing each value of the repeatedly calculated differences with a threshold;

process of starting measurement of a first predetermined time if the difference value is the threshold or more;

process of determining that discharge has occurred if the difference values of the threshold or more continue until the first predetermined time passes;

process of counting the number of calculating the difference value of less than the threshold if the difference value is less than the threshold while the first predetermined time passes;

process of terminating the measurement of the first predetermined time midway if the number of calculating the difference value of less than the threshold reaches a predetermined number of times; and process of determining that discharge has occurred if the difference value is the threshold or more before the number of calculating the difference value of less than the threshold reaches the predetermined number of times and the difference values of the threshold or more continue until the first predetermined time passes.

\* \* \* \* \*